US011256630B2

(12) United States Patent
Lv et al.

(10) Patent No.: US 11,256,630 B2
(45) Date of Patent: Feb. 22, 2022

(54) CACHE ADDRESS MAPPING METHOD AND RELATED DEVICE

(71) Applicant: HUAWEI TECHNOLOGIES CO., LTD., Guangdong (CN)

(72) Inventors: Yandong Lv, Shanghai (CN); Jianjiang Ceng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/886,752

(22) Filed: May 28, 2020

(65) Prior Publication Data

US 2020/0293455 A1 Sep. 17, 2020

Related U.S. Application Data

(63) Continuation of application No. PCT/CN2018/089377, filed on May 31, 2018.

(30) Foreign Application Priority Data

Nov. 30, 2017 (CN) .......................... 201711247808.X

(51) Int. Cl.
*G06F 12/10* (2016.01)
*G06F 12/0811* (2016.01)

(52) U.S. Cl.
CPC .......... *G06F 12/10* (2013.01); *G06F 12/0811* (2013.01); *G06F 2212/608* (2013.01)

(58) Field of Classification Search
CPC . G06F 12/10; G06F 12/0811; G06F 2212/608
USPC ......................................................... 711/203
See application file for complete search history.

(56) References Cited

U.S. PATENT DOCUMENTS 6,408,368 B1   6/2002  Parady
7,237,084 B2   6/2007  Larson et al.
(Continued)

FOREIGN PATENT DOCUMENTS

CN    102323909 A    1/2012
CN    102521150 A    6/2012
(Continued)

OTHER PUBLICATIONS

Hill M D, Smith A J. Evaluating associativity in CPU caches. IEEE Transactions on Computers, 1989, 38(12): 1612-1630.
(Continued)

*Primary Examiner* — Hua J Song
(74) *Attorney, Agent, or Firm* — Leydig, Voit & Mayer, Ltd.

(57) ABSTRACT

This application discloses a cache address mapping method and a related device. The method includes: obtaining a binary file, the binary file including a first hot section; obtaining alignment information of a second hot section, the second hot section is a hot section that has been loaded into a cache, and the alignment information includes a set index of a last cache set occupied by the second hot section; and performing an offset operation on the first hot section based on the alignment information. According to embodiments of the present invention, a problem of a conflict miss of a cache in an N-way set associative structure can be resolved without increasing physical hardware overheads, thereby improving a cache hit rate.

17 Claims, 13 Drawing Sheets

(56) References Cited

U.S. PATENT DOCUMENTS

| | | | |
|---|---|---|---|
| 7,299,318 B2* | 11/2007 | Stoutamire | G06F 8/4442 |
| | | | 711/118 |
| 7,913,040 B2 | 3/2011 | Beckmann et al. | |
| 9,959,215 B2* | 5/2018 | Boehm | G06F 11/366 |
| 2008/0313420 A1 | 12/2008 | Beckmann et al. | |
| 2014/0344522 A1 | 11/2014 | Fan et al. | |
| 2016/0004644 A1* | 1/2016 | Samanta | G06F 12/0804 |
| | | | 711/3 |
| 2016/0371198 A1 | 12/2016 | Cui et al. | |
| 2017/0329712 A1 | 11/2017 | Goebel | |

FOREIGN PATENT DOCUMENTS

| | | |
|---|---|---|
| CN | 102662868 A | 9/2012 |
| CN | 103365797 A | 10/2013 |
| CN | 104899159 A | 9/2015 |

OTHER PUBLICATIONS

Afek Y, Dice D, Morrison A. Cache index-aware memory allocation, ACM SIGPLAN Notices. ACM, 2011,46(11): 55-64.

Kessler R E, Hill M D. Page placement algorithms for large real-indexed caches. ACM Transactions on Computer Systems (TOCS), 1992, 10(4): 338-359.

Gonz lez A, Valero M, Topham N, et al. On the effectiveness of XOR-mapping schemes for cache memories. Published Computer Science, 1996. total 22 pages.

Jouppi N P. Improving direct-mapped cache performance by the addition of a small fully-associative cache and prefetch buffers, Computer Architecture, 1990. Proceedings., 17th Annual International Symposium on. IEEE, 1990: 364-373.

* cited by examiner

CACHE ADDRESS MAPPING METHOD AND RELATED DEVICE

CROSS-REFERENCE TO RELATED APPLICATIONS

This application is a continuation of International Application No. PCT/CN2018/089377, filed on May 31, 2018, which claims priority to Chinese Patent Application No. 201711247808.X, filed on Nov. 30, 2017. The disclosures of the aforementioned applications are hereby incorporated by reference in their entireties.

TECHNICAL FIELD

This application relates to the field of cache technologies, and in particular, to a cache address mapping method and a related device.

BACKGROUND

A cache (cache) is a memory used for high-speed data exchange between a computer processor (Central Processing Unit, CPU) and a main memory (main memory) of a computer. The cache has a relatively small capacity but a read/write speed that is close to a processing speed of the CPU and far higher than that of the main memory. The cache is organized in a form of cache lines (cache line). A function of the cache is to store an instruction or data that recently needs to be run in the CPU. When the CPU needs to access the main memory (main memory for short), if required data or a required instruction is in a cache line, it is referred to as a cache hit (cache hit), and in this case, the CPU directly obtains the required data or the required instruction without a need to access the main memory, thereby improving an access speed; or if required data or a required instruction is not in a cache line, it is referred to as a cache miss (cache miss), and in this case, the CPU needs to load the data or the instruction into the cache from an external main memory, and if the cache line is already occupied in this case, data or an instruction in the cache line needs to be replaced, thereby causing obvious performance degradation. Usually, there are three reasons for the cache miss: a compulsory miss (compulsory miss), a capacity miss (capacity miss), and a conflict miss (conflict miss). The conflict miss is an access conflict caused when a plurality of addresses are mapped to a same cache unit.

A current mainstream cache hardware architecture uses an N-way set associative (N-way Set Associative) structure. An N-way set associative cache is divided into several cache sets (cache set), and each cache set includes N cache lines that are also referred to as N ways. Data block addresses in N main memories may be mapped to a same cache set of the cache, and may be mapped to any way (way) in the cache set. The N-way set associative (N-way Set Associative) structure can alleviate, to some extent, a cache miss problem caused by a conflict miss. However, if there is a relatively large quantity of concurrently running programs in the CPU and the CPU has relatively heavy load, an access conflict due to an insufficient quantity of ways of the cache still exists. Limited by factors such as a delay, power consumption, and costs of physical hardware of the processor, it is very difficult to greatly improve a capacity of the cache and the quantity of ways of the cache. Therefore, the current mainstream cache hardware architecture still has a problem of a cache access conflict caused when a plurality of data blocks simultaneously contend for a cache line in a same set, thereby affecting performance of an entire computer system.

SUMMARY

To resolve a defect of the prior art, embodiments of the present invention provide a cache address mapping method and a related device, so that a problem of a conflict miss of a cache in an N-way set associative structure can be resolved without increasing physical hardware overheads, thereby improving a cache hit rate.

According to a first aspect, an embodiment of the present invention provides a cache address mapping method, where the cache includes a plurality of cache sets, and the method includes: obtaining a binary file, where the binary file includes a first hot section, and the first hot section includes one hot function, or the first hot section includes a plurality of merged hot functions; obtaining alignment information of a second hot section, where the second hot section is a hot section that has been loaded into the cache, and the alignment information includes a set index of a last cache set occupied by the second hot section after the second hot section is loaded into the cache; and performing an offset operation on the first hot section based on the alignment information, so that the first hot section is mapped to cache set with consecutive address in the cache, and the cache set with consecutive address is adjacent to the last cache set.

The binary file usually includes a data segment (data segment), a code segment (code segment), and the like. The code segment has a code section (code section), and the code section is, for example, some specific function codes. In many application scenarios, a set of programs or a shared library needs to run on a same processing core to contend for a same cache set. A function code that is in a binary file of a program or the shared library and that frequently runs in a CPU is referred to as a hot function. During running of the program, the hot function or the shared library occupies the CPU for a relatively long time and is executed for quite many times, and is frequently accessed, and therefore needs to be regularly cached in a cache. In this embodiment of the present invention, to reduce a cache conflict, the hot function that needs to be regularly cached in the cache may be first identified as a special segment, and this special segment is referred to as a hot section (hot section). Correspondingly, a segment in the binary file other than the hot section may be referred to as a non-hot section. If there is only one hot function in program source code, after the program source code is compiled into a binary file, the hot function is a hot section in the binary file. If there are a plurality of hot functions in the program source code, the plurality of hot functions need to be merged into a hot section during compilation of the program source code. All the hot functions have a same identifier, and the identifier is used to merge the plurality of hot functions into the hot section. Merging the plurality of hot functions into the hot section is performing a relocation operation on code addresses of the hot functions. After the relocation operation, the plurality of hot functions has consecutive addresses in the binary file.

In this embodiment of the present invention, "adjacent" means that set indexes of two cache sets are close to each other, and a cache set adjacent to the last cache set is a next cache set of the last cache set. For example, if a set index of a cache set is 128, a cache set (a next cache set) adjacent to the cache set is a cache set whose set index is 129.

Specifically, this embodiment of the present invention provides a loader. The loader has alignment information of a global variable nature, and the alignment information records a set index of a last cache set occupied by a previous loaded hot section. When an operating system currently needs to run a program or a shared library, alignment information of the previous loaded hot section may be obtained by using the loader. In this embodiment of the present invention, a hot section that currently needs to be loaded is mapped, by using an offset operation, to a next cache set of the last cache set occupied by the previous loaded hot section, so that cache line indexes (cache line index) corresponding to hot sections of different binary files are consecutive. After the offset operation, a gap between the hot sections does not exceed one cache set. In this way, cache space can be more fully used, and a set of associated programs can be optimized. In addition, more space is available to another program, so that a conflict miss of the cache can be avoided to a maximum extent.

With reference to the first aspect, in a possible embodiment, the performing an offset operation on the first hot section based on the alignment information includes: performing an offset operation on a storage address of the first hot section based on the alignment information, so that the storage address of the first hot section is mapped to cache set with consecutive address in the cache, and the cache set with consecutive address is adjacent to the last cache set, where the storage address includes a virtual address or a physical address.

With reference to the first aspect, in a possible embodiment, a type of the cache is a virtual index physical tag VIPT architecture; a mapping manner of the cache includes mapping the virtual address to a cache set of the cache; and the performing an offset operation on the first hot section based on the alignment information includes: performing an offset operation on the virtual address of the first hot section based on the alignment information, so that the virtual address of the first hot section is mapped to consecutive cache sets, and the consecutive cache sets immediately follow the last cache set.

With reference to the first aspect, in a possible embodiment, the performing an offset operation on the virtual address of the first hot section based on the alignment information includes: obtaining the virtual address of the first hot section; determining a cache set adjacent to the last cache set based on the alignment information; obtaining an offset of the offset operation based on the adjacent cache set and the virtual address of the first hot section; and performing the offset operation on the virtual address of the first hot section based on the offset of the offset operation.

In a possible embodiment, the offset operation may be performed, based on the alignment information, on a virtual address of a binary file that currently needs to be loaded. To be specific, an offset operation (relocation) with a specific offset is performed on both a virtual address of a hot section and a virtual address of a non-hot section. After the offset operation, the virtual address of the hot section is mapped to consecutive cache sets, and the consecutive cache sets immediately follow the last cache set. In a specific implementation process, the virtual address of the binary file that currently needs to be loaded and the virtual address of the hot section may be obtained from the loader; a next cache set of the last index is determined based on the alignment information; an offset of the offset operation is determined based on the next cache set and the virtual address of the hot section; and the offset operation is performed, based on the offset of the offset operation, on the memory virtual address of the binary file that currently needs to be loaded, so that the virtual address of the hot section of the binary file is mapped to the next cache set of the last_index.

In another possible embodiment, the offset operation (relocation) may be performed, based on the alignment information, only on a virtual address of a hot section that currently needs to be loaded, and no offset operation is performed on a virtual address of a non-hot section. After the offset operation, the virtual address of the hot section is mapped to consecutive cache sets, and the consecutive cache sets immediately follow the last cache set. In a specific implementation process, the virtual address of the hot section that currently needs to be loaded may be obtained from the loader; a next cache set of the last_index is determined based on the alignment information; an offset of the offset operation is obtained based on the next cache set and the virtual address of the hot section; and the offset operation is performed, based on the offset of the offset operation, on the virtual address of the hot section, so that the virtual address of the hot section of the binary file is mapped to the next cache set of the last_index.

In specific implementation, after the relocation, the hot section can be mapped to consecutive cache sets starting from a cache set whose set index is ((last_index+1) % Quantity of cache sets) (where % indicates a remainder operation), where the last_index indicates a set index that is of a last cache set occupied by a previous loaded hot section and that is recorded in the alignment information. Because the hot section is mapped starting from the cache set whose set index is ((last_index+1) % Quantity of cache sets), after an entire way is occupied by the hot section, the hot section is cyclically mapped to the cache sets. Cache set overlapping occurs between a plurality of hot sections only when an entire way of the cache is occupied, and a cache conflict occurs only when a plurality of ways are all occupied. Therefore, a conflict miss can be reduced to a maximum extent.

With reference to the first aspect, in a possible embodiment, a type of the cache is a physical index physical tag PIPT architecture; a mapping manner of the cache includes mapping the physical address to a cache set of the cache; and the performing an offset operation on the first hot section based on the alignment information includes: performing an offset operation on a first page offset of the virtual address of the first hot section based on the alignment information, and performing a physical page allocation operation for a physical page on which the first hot section is located, to obtain an allocated physical page and the physical address of the first hot section; and mapping the physical address that is of the first hot section and that is on the physical page to consecutive cache sets, where the consecutive cache sets immediately follow the last cache set.

Specifically, this embodiment of the present invention provides a loader. The loader has alignment information of a global variable nature, and the alignment information records a set index of a last cache set (to be specific, a cache line index corresponding to the cache set) occupied by a previous loaded hot section. When an operating system currently needs to load a program or a shared library, alignment information of the previous loaded hot section may be obtained by using the loader.

With reference to the first aspect, in a possible embodiment, the performing an offset operation on a first page offset of the virtual address of the first hot section based on the alignment information, and performing a physical page allocation operation for a physical page on which the first hot section is located, to obtain an allocated physical page and the physical address of the first hot section includes: obtaining an offset of the offset operation based on the next cache set and the first page offset of the virtual address of the first hot section; performing the offset operation on the first page offset of the virtual address of the first hot section based on the offset, to obtain a second page offset of the virtual address of the first hot section; obtaining, based on the next cache set of the last cache set, a color index of a page related to the first hot section; obtaining an allocated physical page based on the color index; and obtaining the physical address of the first hot section based on the second page offset and a page frame number PFN that corresponds to the allocated physical page.

The physical address includes two parts: a page frame number (PFN) and a page offset (page offset). For PIPT, the page offset of the physical address directly originates from a page offset part of the virtual address.

For the page offset of the physical address, in a possible embodiment, the alignment information may be queried by using the loader to determine a next cache set of the last cache set occupied by the previous loaded hot section, and a PFN-related part and a page offset-related part are obtained based on the next cache set of the last cache set. The PFN-related part is a color index (color index), namely, a color index (color index) of a page related to the hot section. An offset is obtained based on the color index, the page offset-related part, and a page offset of a virtual address of the original hot section that currently needs to be loaded. An offset operation is performed, based on the offset, on a memory virtual address of a binary file that currently needs to be loaded. To be specific, an offset operation (relocation) with a specific offset is performed on both a virtual address of a hot section and a virtual address of a non-hot section. In this process, a page offset of the virtual address of the hot section is correspondingly offset, to re-obtain a new page offset of the virtual address of the hot section, and then the new page offset of the virtual address is used as the page offset of the physical address.

For the page offset of the physical address, in another possible embodiment, the alignment information may be queried by using the loader to determine a next cache set of the last cache set occupied by the previous loaded hot section, and a color index (color index) of a page related to the hot section is obtained based on the next cache set of the last cache set. An offset is obtained based on the color index and a page offset of a virtual address of the original hot section that currently needs to be loaded. An offset operation (relocation) is performed, based on the offset, on the page offset of the virtual address of the hot section that currently needs to be loaded, and no offset operation is performed on a virtual address of a non-hot section, to re-obtain a new page offset of the virtual address of the hot section, and then the new page offset of the virtual address is used as the page offset of the physical address.

For the page frame number of the physical address, because the PFN is from a page table, page allocation needs to be performed based on a bit that is in the color index and that is related to a physical page by using a physical page allocator, to obtain an allocated page, where a page frame number corresponding to the allocated page is the page frame number of the physical address.

With reference to the first aspect, in a possible embodiment, the obtaining an allocated physical page based on the color index includes:

randomly obtaining a specific quantity of consecutive physical pages from a physical page allocator based on the color index; and selecting a physical page that conforms to the color index as the allocated physical page from the specific quantity of consecutive physical pages, where the specific quantity is equal to a sum of a quantity of the allocated physical pages and a quantity of page colors minus 1, and the quantity of page colors is determined by a quantity of bits of the color index.

When interruption occurs due to page missing in a program execution process, physical page allocation is triggered. Specifically, in this embodiment of the present invention, the physical page allocator randomly obtains a specific quantity of consecutive physical pages based on the color index (color index). For physical addresses, if color indexes at least significant bits of their PFNs are the same, the physical addresses belong to a same cache bin, that is, the physical addresses have a same color. To implement a page alignment solution in the present invention, after a color index of a currently to-be-allocated page is determined, N consecutive physical pages may be randomly allocated, where N=Quantity of pages requested to be allocated+ Quantity of page colors−1, the quantity of pages requested to be allocated is a quantity of actually allocated physical pages, the quantity of pages requested to be allocated can meet a requirement for carrying the hot section that needs to be loaded, and the quantity of page colors is determined by a quantity of bits of the color index. In this embodiment of the present invention, the N consecutive physical pages definitely have a physical page that conforms to the color index. A physical page with the color index is selected from the N consecutive physical pages as a physical page to be actually allocated, and the physical page can definitely meet a page alignment requirement.

It should be noted that, in a specific embodiment, because the hot section is mapped starting from the cache set whose set index is ((last_index+1) % Quantity of cache sets), after an entire way is occupied by the hot section, the hot section is cyclically mapped to the cache sets. Cache set overlapping occurs between a plurality of hot sections only when an entire way of the cache is occupied, and a cache conflict occurs only when a plurality of ways are all occupied. Therefore, a conflict miss can be reduced to a maximum extent.

With reference to the first aspect, in a possible embodiment, a quantity of cache sets occupied by the second hot section is determined based on a virtual address size of the second hot section; and the last cache set occupied by the second hot section after the second hot section is mapped into the cache is determined based on the quantity of cache sets occupied by the second hot section and a last cache set occupied by a third hot section after the third hot section is mapped into the cache, and a set index of the last cache set is updated into the alignment information, where the third hot section is a hot section that has been loaded into the cache before the second hot section is loaded.

According to a second aspect, an embodiment of the present invention provides a device, where the device includes an obtaining module, a loader module, and an offsetting module. The obtaining module is configured to obtain a binary file, where the binary file includes a first hot section, and the first hot section includes one hot function, or the first hot section includes a plurality of merged hot functions. The loader module is configured to obtain alignment information of a second hot section, where the second hot section is a hot section that has been loaded before the first hot section is loaded, the alignment information includes a set index of a last cache set occupied by the second hot section after the second hot section is mapped into a cache, and the cache includes a plurality of cache sets. The offsetting module is configured to perform an offset operation on the first hot section based on the alignment information, so that the first hot section is mapped to consecutive cache sets, and the consecutive cache sets immediately follow the last cache set. It should be noted that, in a possible embodiment, the device further includes a physical page allocation module. In specific implementation, the modules of the device are configured to implement the method according to the first aspect.

According to a third aspect, an embodiment of the present invention provides another device. The device includes a processor, a cache, and a main memory, where the cache includes a plurality of cache sets, and the processor is configured to implement the method according to the first aspect.

According to a fourth aspect, an embodiment of the present invention provides a computer readable storage medium, configured to store code for implementing the method according to the first aspect.

According to a fifth aspect, an embodiment of the present invention provides a computer software product, and when the computer software product runs on a computer, the method according to the first aspect can be implemented.

It can be learned that, for a system architecture including a VIPT-type cache, in the embodiments of the present invention, hot functions are merged into a hot section, code address space is relocated, and the hot section that currently needs to be loaded is mapped to the next cache set of the last cache set occupied by the previous loaded hot section, so that cache line indexes (cache line index) corresponding to hot sections of different binary files are consecutive, and a gap between the hot sections is small. For a system architecture including a PIPT-type cache, in the embodiments of the present invention, hot functions are merged into a hot section, the loader performs the offset operation on the page offset of the virtual address, the page allocated by the physical page allocator is obtained in a relatively convenient manner, code address space is relocated, and the hot section that currently needs to be loaded is mapped to the next cache set of the last cache set occupied by the previous loaded hot section, so that cache line indexes (cache line index) corresponding to hot sections of different binary files are consecutive, and a gap between the hot sections is small. Therefore, according to the embodiments of the present invention, cache space can be more fully used, and a set of associated programs can be optimized. In addition, more space is available to another program, so that a conflict miss of the cache can be avoided to a maximum extent.

DESCRIPTION OF EMBODIMENTS

Figure 1:
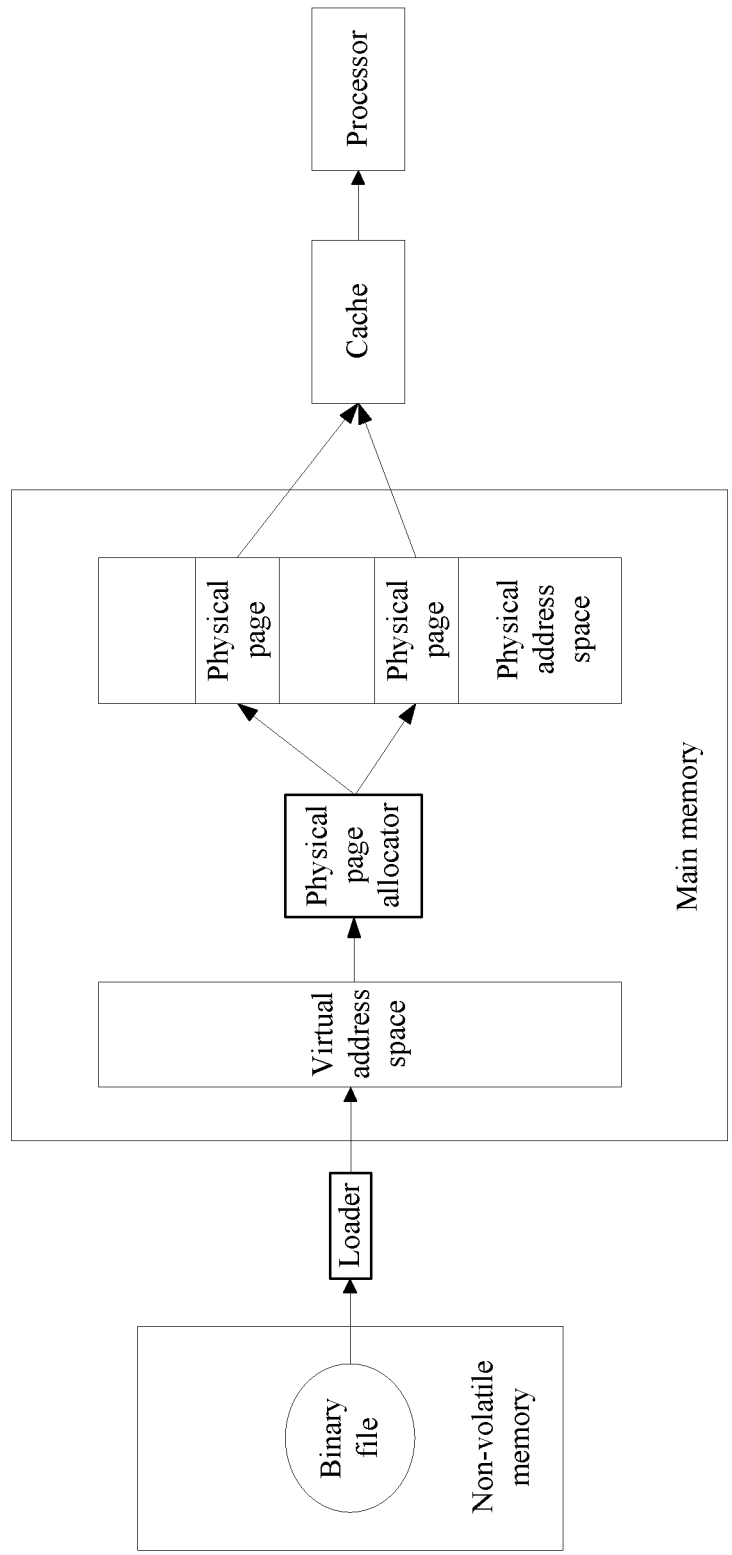
FIG. 1 is a schematic diagram of a system architecture in an application scenario according to an embodiment of the present invention.

The following describes a system architecture used in solutions in embodiments of the present invention with reference to related accompanying drawings. An entity of the system architecture may be a computer having a paging mechanism operating system, including a general purpose computer, a terminal device, a server, a notebook computer, a smartphone, a PAD, a vehicle-mounted mobile apparatus, a personal digital assistant PDA, a cloud computing server, and the like. As shown in FIG. 1, the system architecture includes a non-volatile memory (such as a hard disk, an optical disk, and a flash memory), a main memory, a cache, a processor, and the like. The non-volatile memory may be configured to store a binary file such as a program or a shared library. The main memory has a storage address, and may be further divided into virtual address space in which there is a virtual address and physical address space in which there is a physical address. The cache is of an N-way set associative structure, and N is an integer greater than or equal to 1. A required binary file may be loaded by a loader into the memory from the non-volatile memory and then executed by the processor after being cached into the cache. Specifically, the binary file may be loaded into the virtual address space by using the loader, where a relationship between a binary file and a virtual address has been established. In this case, the real binary file has not been read into the main memory. During program execution, if a corresponding physical page for access of a virtual page has not been allocated, interruption occurs due to page missing. In this case, an operating system responds to a page miss request, and invokes a physical page allocator to allocate a corresponding physical page in the physical address space, and one program may finally be mapped to scattered physical page locations. Then the operating system continues to execute a program, and the binary file is mapped to the cache and is executed by the processor.

A cache hardware architecture in the embodiments of the present invention is usually an N-way set associative structure. The N-way set associative structure is briefly described below.

A cache in the N-way set associative structure may be divided into M cache sets (cache set), each set may have N cache lines (for example, N may be 2, 4, 8, or 16, and the cache is referred to as a 2-way, 4-way, 8-way, or 16-way set associative cache), and each cache line is one way. For each cache set, each way of cache line has a same cache line index (cache line index). A main memory of the N-way set associative structure may be divided into K sets, and each set is divided into M blocks (that is, corresponding to M storage addresses). In other words, a quantity of blocks in one set of the main memory is the same as a quantity of cache sets in the cache. Each block in the main memory is in a fixed mapping relationship with each set of the cache, and may be freely mapped to any way of cache line in the corresponding cache set.

Figure 2:
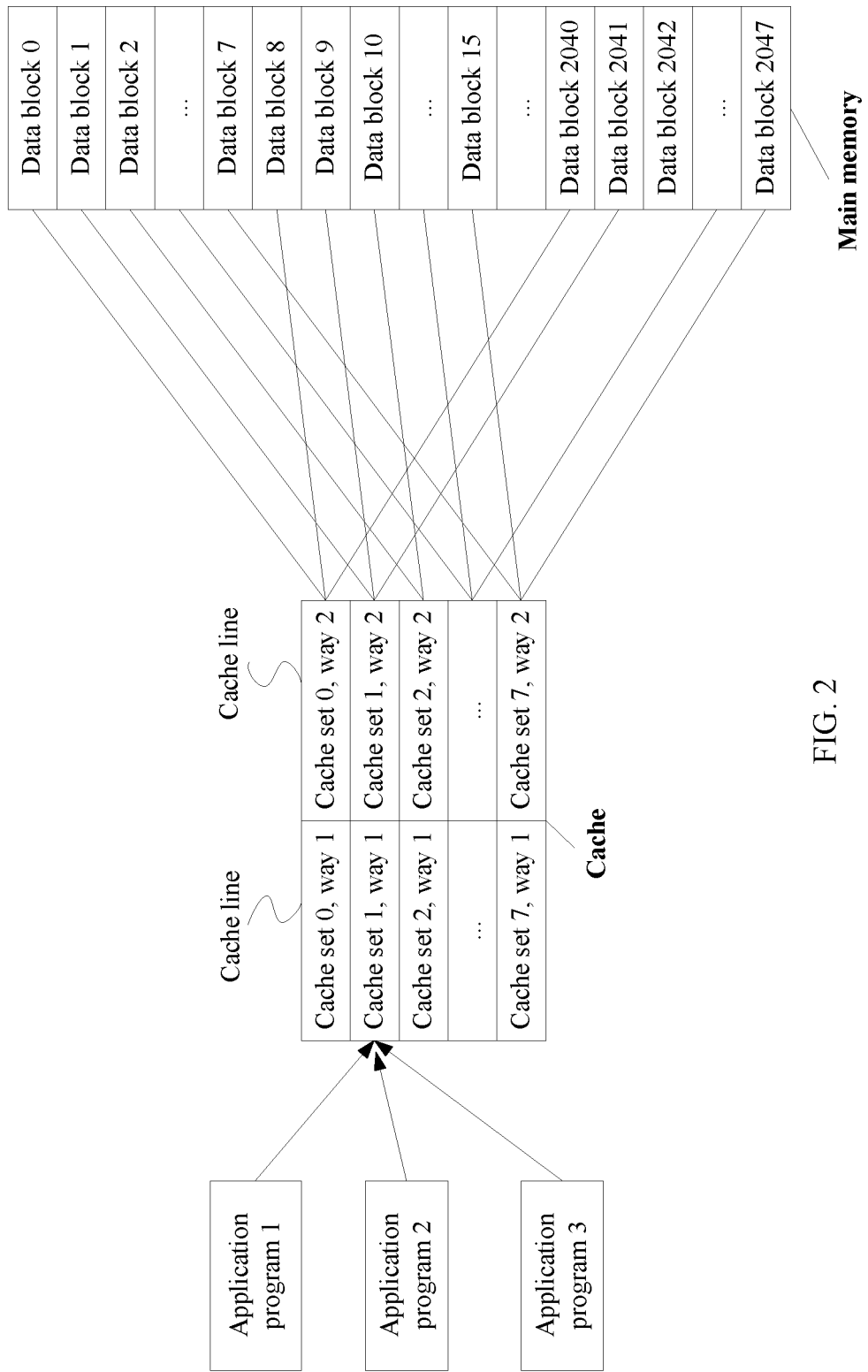
FIG. 2 is a schematic diagram of an N-way set associative structure according to an embodiment of the present invention.

For example, as shown in FIG. 2, a cache hardware architecture is a two-way set associative structure, a cache is divided into eight sets, and each set has two ways of cache lines; a main memory is divided into 256 sets, and each set has eight data blocks; a data block 1, a data block 8, . . . , a data block 2041, and the like in the main memory may all be fixedly mapped to a cache set 1, and may be freely mapped to a cache line {cache set 1, way 1} or a cache line {cache set 1, way 2}.

Generally, if three or more programs (for example, an application program 1, an application program 2, and an application program 3 shown in FIG. 2) run in parallel at the same time on a processor, and all these programs need to access the cache set 1 at the same time, because a same set of a cache 1 can accommodate only two data blocks with a same cache line index at a same moment, the three application programs simultaneously contend for the cache set 1 in this case, and therefore data blocks in the cache set 1 are frequently replaced with each other definitely, thereby causing a severe cache performance loss. Limited by factors such as a delay, power consumption, and costs of physical hardware of the processor, it is very difficult to greatly improve a capacity of the cache and the quantity of ways of the cache. When concurrent running load is relatively large, a current mainstream N-way set associative structure is also prone to a conflict miss.

Figure 3:
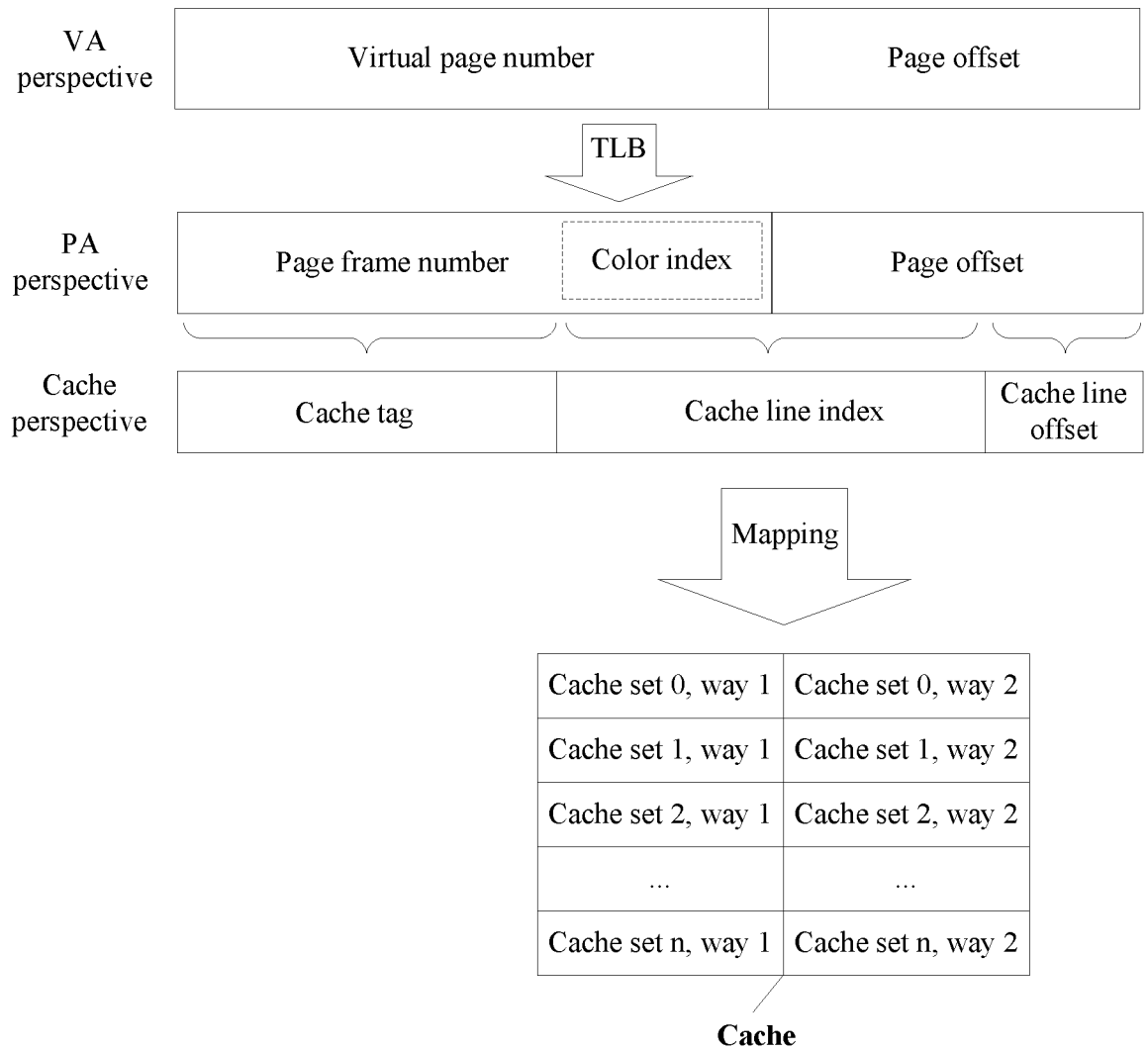
FIG. 3 is a schematic diagram of a mapping manner of a paging mechanism operating system in the prior art.

In addition, an example paging mechanism operating system performs memory management in units of pages (page), and separates different programs at a granularity of pages by using a page coloring (page coloring) technology, to avoid a conflict miss. As shown in FIG. 3, from a perspective of an operating system, a virtual address (Virtual address, VA) may be divided into two parts: a virtual page number (virtual page number) and a page offset (page offset); and a physical address (Physical address, PA) may also be divided into two parts: a page frame number (page frame number, PFN) and a page offset (Page Offset). The page number may be used to represent a specific page, and a quantity of bits of the page offset may be used to represent a size of the page. A mapping relationship between a virtual page address and a physical page address is stored in a page table in a translation lookaside buffer (TLB) of the operating system. When a CPU sends address access, an address sent from the CPU is a virtual address. After page table address mapping, a page frame number corresponding to a virtual page number is queried, and a physical address is obtained with reference to a page offset. From a perspective of a cache, a storage address may be divided into three parts: a cache tag (Cache Tag), a cache line index (Cache line Index), and a cache line offset (Cache Line Offset). A quantity of bits of the cache line offset may represent a cache line size, a quantity of bits of the cache line index may be used to represent a quantity of cache sets, and the cache tag may be used to determine an ultimate mapped-to cache line. The cache determines, based on a capacity of a single way of the cache and the cache line size of the cache, a quantity of bits of the physical address that are occupied by the cache line index and the cache line offset, and then determines, based on a specific bit of the physical address, a specific mapped-to cache set and a specific mapped-to byte. In the PFN, an intersection part of the PFN and the cache line index is referred to as a color index (color index). The operating system controls the color index, and allocates a corresponding page by using a physical page allocator, so that an address can be mapped to a specified set that has consecutive cache sets. This set is referred to as a cache bin, and physical pages with a same color index are physical pages that have a same color. In this way, different color indexes are allocated to different programs, so that the programs each can be mapped to a specified cache bin, thereby alleviating a conflict miss.

However, in actual application, because a capacity of a single way of a cache at L1 is usually relatively small, and a quantity of pages is relatively limited, there is a small quantity of available colors if programs are staggered at a granularity of pages. When there is a relatively large quantity of concurrent programs, there is still a relatively high probability of a conflict miss. In addition, the operating system also needs an extra data structure (such as a linked list) to record a color allocation situation, and frequent query of the allocation situation leads to relatively large extra overheads.

To resolve the defect of the prior art, the following describes, based on a system architecture provided in the embodiments of the present invention, an implementation of reducing a cache conflict. In the embodiments of the present invention, for a mapping relationship between a cache set and a storage address of a main memory, a cache type may be a virtual index physical tag (VIPT) or a physical index physical tag (PIPT). In the embodiments of the present invention, the technical solutions of the embodiments of the present invention are described from the two cache types: PIPT and VIPT.

The two cache types PIPT and VIPT in the embodiments of the present invention are briefly described below.

Figure 4:
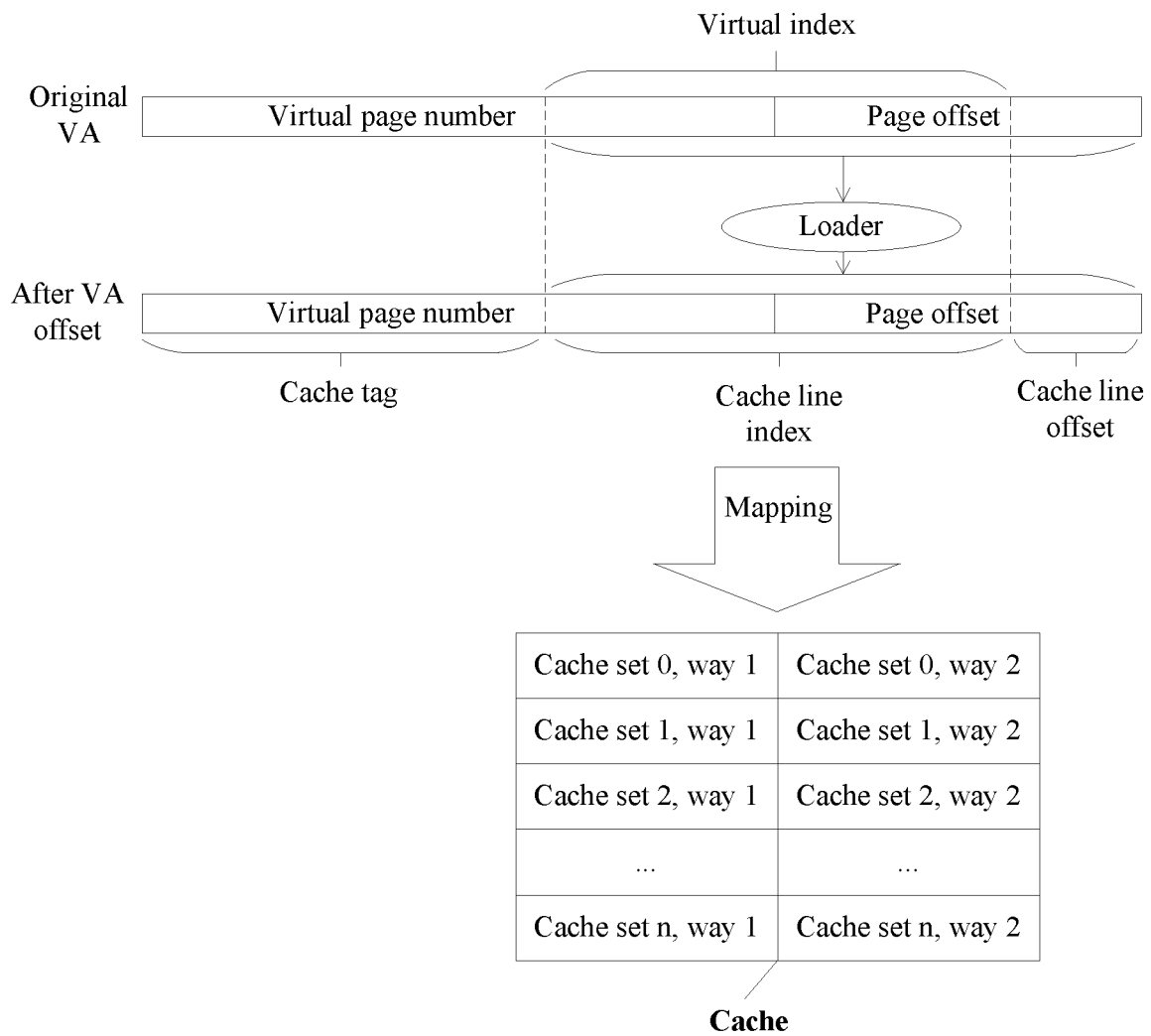
FIG. 4 is a schematic diagram of a mapping manner according to an embodiment of the present invention.

(1) VIPT. As shown in FIG. 4, in mapping between a storage address and a cache set, when a CPU needs to access an address, on one hand, a virtual index (virtual index) of a virtual address output by the CPU directly corresponds to a cache line index (Cache line Index) of a cache, and therefore, the cache line index is directly used to search for a cache set; and on the other hand, the virtual address output by the CPU is translated into a physical address by using a memory management unit (MMU) based on a translation lookaside buffer (TLB) of the memory management unit, and then a cache line (cache line) in the cache set is matched by using a cache tag (Cache Tag) corresponding to the physical address. If the cache line can be finally successfully determined, it is a cache hit; otherwise, it is a cache miss.

In an embodiment of the present invention, for a VIPT-type cache, a loader is disposed, and the loader has an offset perception function. Specifically, the loader maintains alignment information, and the alignment information is used to indicate a last cache set (which may be referred to as a last index) occupied by previous loaded program code in the cache. In this case, the loader calculates an offset, and performs, based on the offset, an offset operation at a fine granularity on a virtual address of program code that currently needs to be loaded, so that a code segment in a program that currently needs to be loaded immediately follows a code segment in a previous loaded program, and is consecutively mapped to several cache sets whose start point is a next cache set of the last index, and a physical page allocator does not need to be invoked for page allocation. In this way, cache space can be more fully used, so that distribution of a set of associated programs in the cache space can be optimized, and more space is available to another program.

Figure 5:
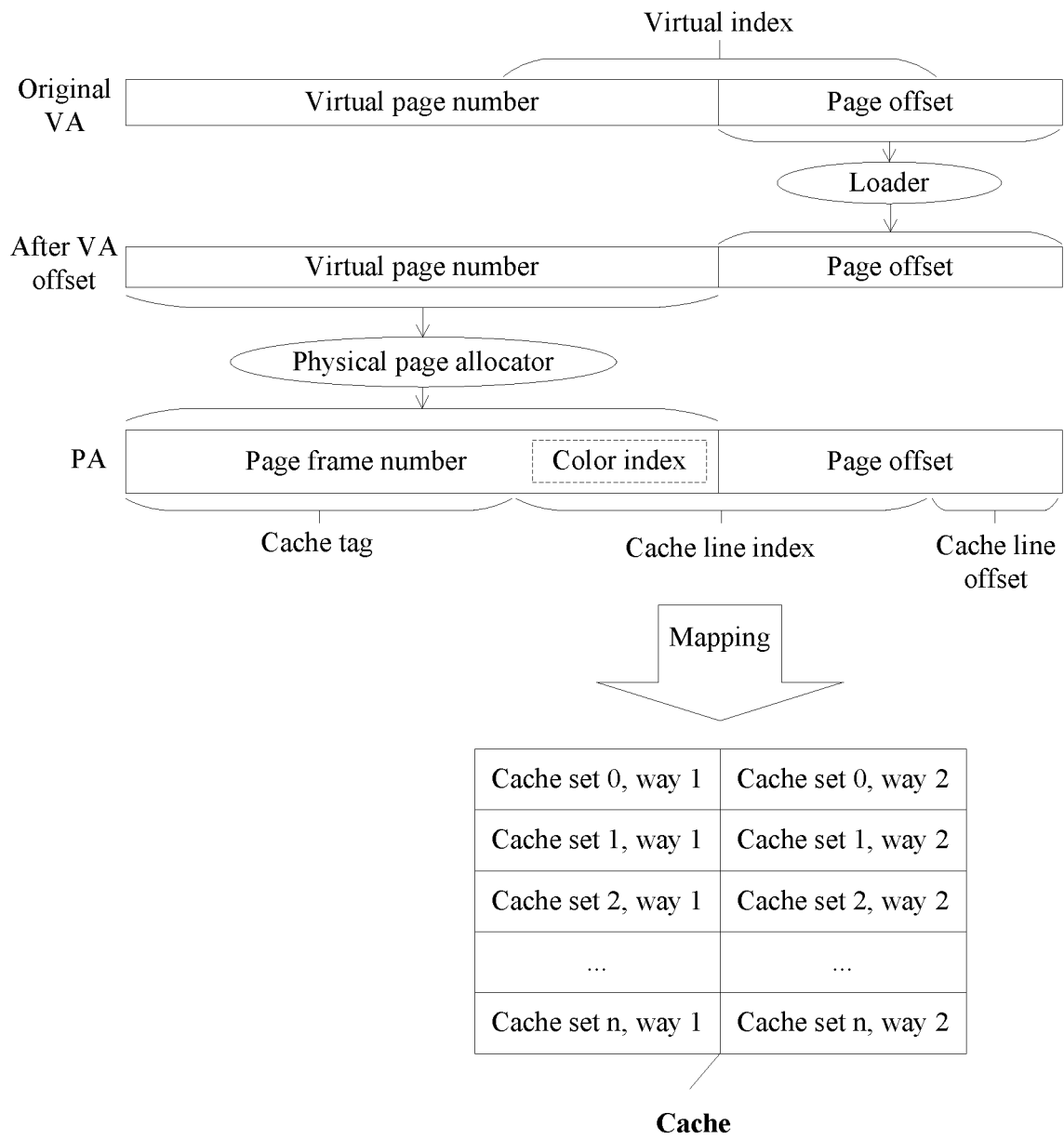
FIG. 5 is a schematic diagram of another mapping manner according to an embodiment of the present invention.

(2) PIPT. As shown in FIG. 5, in mapping between a storage address and a cache set, when a CPU needs to access an address, a virtual address output by the CPU is translated into a physical address by using a memory management unit (MMU) based on a translation lookaside buffer (TLB) of the memory management unit, and a physical index (physical index) of the physical address corresponds to a cache line index (Cache line Index) of the cache. Therefore, the cache line index (Cache Line Index) is used to search for a cache set. In addition, a cache tag (Cache Tag) corresponding to the physical address is further used to match a cache line (cache line) in the cache set. If the cache line can be finally successfully determined, it is a cache hit; otherwise, it is a cache miss.

In an embodiment of the present invention, for a PIPT-type cache, a loader is disposed, and the loader has an offset perception function. Specifically, the loader maintains alignment information, and the alignment information is used to indicate a last cache set (which may be referred to as a last index) occupied by previous loaded program code in the cache. In this case, the loader calculates an offset, and performs, based on the offset, an offset operation at a fine granularity on a page offset (page offset) of an original virtual address of program code that currently needs to be loaded. In addition, the virtual address is translated into a physical address by using a TLB, and a page frame number of the physical address is from a page table and is determined only when processing is interrupted due to page missing in a program running process, and therefore a physical page allocator needs to be invoked to allocate a physical page corresponding to the page frame number. In this embodiment of the present invention, the physical page allocator randomly allocates a specific quantity of physical pages, and the specific quantity is equal to a quantity of pages requested to be allocated plus a quantity of page colors of the cache minus 1. In this case, in the specific quantity of physical pages, there is definitely a physical page that can be aligned with a physical page of a previous loaded program, and the aligned physical page is selected as a physical page of a final loaded program. In this way, after a finally obtained physical address is mapped to the cache, a code segment in a program that currently needs to be loaded immediately follows a code segment in the previous loaded program, and is consecutively mapped to several cache sets whose starting point is a next cache set of the last index. In this way, cache space can be more fully used, so that distribution of a set of associated programs in the cache space can be optimized, and more space is available to another program.

A cache address mapping method provided in an embodiment of the present invention to reduce a cache conflict includes but is not limited to the following steps.

Step 1: Obtain a hot section (briefly referred to as a hot section that currently needs to be loaded below) of a binary file that currently needs to be loaded.

The hot section that currently needs to be loaded includes one hot function, or the hot section that currently needs to be loaded includes a plurality of merged hot functions.

When a program or a shared library runs, a binary file of the program or the shared library needs to be loaded from a non-volatile memory to a memory (a main memory). The binary file usually includes a data segment (data segment), a code segment (code segment), and the like. The code segment has a code section (code section), and the code section is, for example, some specific function codes. In many application scenarios, a set of programs or a shared library needs to run on a same processing core to contend for a same cache set. A function code that is in a binary file of a program or the shared library and that frequently runs in a CPU is referred to as a hot function. During running of the program, the hot function or the shared library occupies the CPU for a relatively long time and is executed for quite many times, and is frequently accessed, and therefore needs to be regularly cached in a cache. In this embodiment of the present invention, to reduce a cache conflict, the hot function that needs to be regularly cached in the cache may be first identified as a special segment, and this special segment is referred to as a hot section (hot section). Correspondingly, a segment in the binary file other than the hot section may be referred to as a non-hot section. If there is only one hot function in program source code, after the program source code is compiled into a binary file, the hot function is a hot section in the binary file. If there are a plurality of hot functions in the program source code, the plurality of hot functions need to be merged into a hot section during compilation of the program source code. All the hot functions have a same identifier, and the identifier is used to merge the plurality of hot functions into the hot section. Merging the plurality of hot functions into the hot section is performing a relocation operation on code addresses of the hot functions. After the relocation operation, the plurality of hot functions has consecutive addresses in the binary file.

Step 2: Obtain alignment information of a hot section (briefly referred to as a previous loaded hot section) of a previous loaded binary file, where the alignment information includes a set index of a last cache set occupied by the previous loaded hot section after the previous loaded hot section is mapped to a cache.

The cache is of an N-way set associative structure, and N is an integer greater than or equal to 1.

This embodiment of the present invention provides a loader. The loader has alignment information of a global variable nature, and the alignment information records a set index of a last cache set (to be specific, a cache line index corresponding to the cache set) occupied by a previous loaded hot section. When an operating system currently needs to run a program or a shared library, alignment information of the previous loaded hot section may be obtained by using the loader.

Step 3: Perform, based on the alignment information, an offset operation on the hot section that currently needs to be loaded, so that the hot section that currently needs to be loaded is mapped to consecutive cache sets, and the consecutive cache sets immediately follow the last cache set.

In this embodiment of the present invention, the hot section that currently needs to be loaded is mapped, by using an offset operation, to a next cache set of the last cache set occupied by the previous loaded hot section, so that cache line indexes (cache line index) corresponding to hot sections of different binary files are consecutive. After the offset operation, a gap between the hot sections does not exceed one cache set. In this way, cache space can be more fully used, and a set of associated programs can be optimized. In addition, more space is available to another program, so that a conflict miss of the cache can be avoided to a maximum extent.

In different embodiments of the present invention, there may be different implementations of performing an offset operation on a hot section. The following describes the method provided in this embodiment of the present invention to reduce a cache conflict in detail below separately from two perspectives: a VIPT-type cache and a PIPT-type cache.

Figure 6:
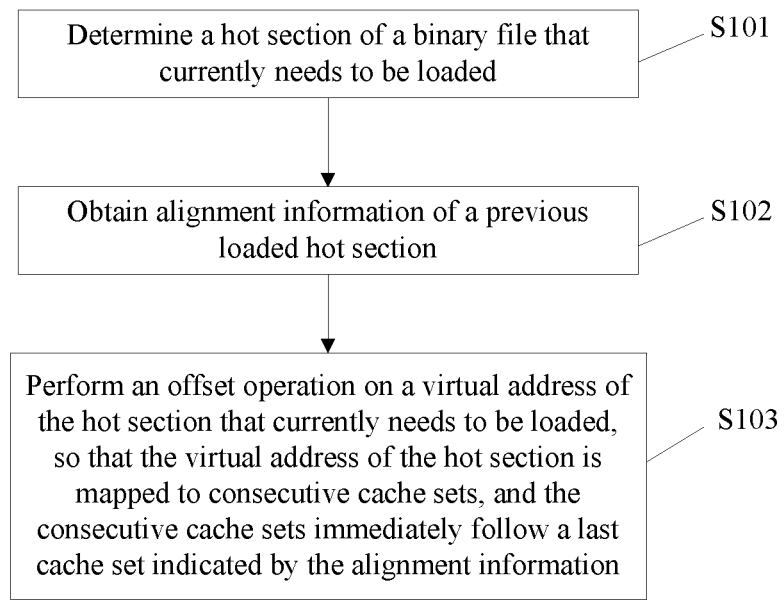
FIG. 6 is a schematic flowchart of a cache address mapping method according to an embodiment of the present invention.

As shown in FIG. 6, a cache address mapping method according to an embodiment of the present invention to reduce a cache conflict is first described below. The method is applied to a system architecture including a VIPT-type cache. The method includes but is not limited to the following steps.

Step S101: Determine a hot section of a binary file that currently needs to be loaded.

In specific implementation, a hot function in a program may be identified by using a means such as profiling. In a compilation process, hot functions are merged into a hot section by using a compilation means. For example, a hot function may be modified by using an attribute identifier "_attribute_", and a hot section to which the function finally belongs is marked in the hot function. In a hot function relocation process, these hot functions with a same attribute identifier are identified, and the hot functions are merged into a same hot section. For the compilation means in a compilation process, a standard option such as executable program compilation (fpie), an executable program link (pie), shared library compilation (fpic), and a shared library link (pic) may be used. A compiled link is address-independent code, so that code address space of the hot function is relocated during loading.

Figure 7:
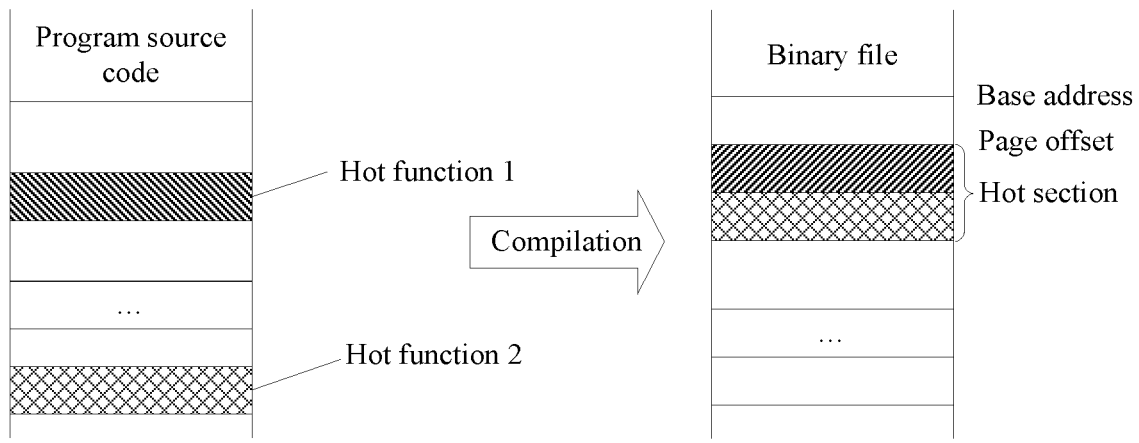
FIG. 7 is a schematic diagram of a hot function merging scenario according to an embodiment of the present invention.

For example, as shown in FIG. 7, original program source code includes a hot function 1 and a hot function 2, the hot function 1 and the hot function 2 are distributed in different code address space, and the hot function 1 and the hot function 2 have a same attribute identifier for modification. When the program source code is compiled into a binary file, the hot function 1 and the hot function 2 are merged into a hot section based on the attribute identifier, and the hot section has a corresponding base address and a page offset. It can be learned that, after the compilation, the hot function 1 and the hot function 2 have consecutive addresses in the binary file.

Step S102: Obtain alignment information of a hot section (briefly referred to as a previous loaded hot section) of a previous loaded binary file, where the alignment information includes a set index of a last cache set occupied by the previous loaded hot section after the previous loaded hot section is mapped to a cache.

This embodiment of the present invention provides a loader. The loader has alignment information of a global variable nature, and the alignment information records a set index of a last cache set (to be specific, a cache line index corresponding to the cache set) occupied by a previous loaded hot section. When an operating system currently needs to run a program or a shared library, alignment information of the previous loaded hot section may be obtained by using the loader.

Step S103: Perform, based on the alignment information, an offset operation on a virtual address of the hot section that currently needs to be loaded, so that the virtual address of the hot section is mapped to consecutive cache sets, and the consecutive cache sets immediately follow the last cache set.

In a possible embodiment, the offset operation may be performed, based on the alignment information, on a virtual address of the binary file that currently needs to be loaded. To be specific, an offset operation (relocation) with a specific offset is performed on both a virtual address of a hot section and a virtual address of a non-hot section. After the offset operation, the virtual address of the hot section is mapped to consecutive cache sets, and the consecutive cache sets immediately follow the last cache set. In a specific implementation process, the virtual address of the binary file that currently needs to be loaded and the virtual address of the hot section may be obtained from the loader; a next cache set of the last_index is determined based on the alignment information; an offset of the offset operation is determined based on the next cache set and the virtual address of the hot section; and the offset operation is performed, based on the offset of the offset operation, on the memory virtual address of the binary file that currently needs to be loaded, so that the virtual address of the hot section of the binary file is mapped to the next cache set of the last_index.

In another possible embodiment, the offset operation (relocation) may be performed, based on the alignment information, only on a virtual address of a hot section that currently needs to be loaded, and no offset operation is performed on a virtual address of a non-hot section. After the offset operation, the virtual address of the hot section is mapped to consecutive cache sets, and the consecutive cache sets immediately follow the last cache set. In a specific implementation process, the virtual address of the hot section that currently needs to be loaded may be obtained from the loader; a next cache set of the last_index is determined based on the alignment information; an offset of the offset operation is obtained based on the next cache set and the virtual address of the hot section; and the offset operation is performed, based on the offset of the offset operation, on the virtual address of the hot section, so that the virtual address of the hot section of the binary file is mapped to the next cache set of the last_index.

Specifically, after the relocation, the hot section can be mapped to consecutive cache sets starting from a cache set whose set index is ((last_index+1) % Quantity of cache sets) (where % indicates a remainder operation), where the last_index indicates a set index that is of a last cache set occupied by a previous loaded hot section and that is recorded in the alignment information.

The following describes, in detail below by using an example, the method provided in this embodiment of the present invention to reduce a cache conflict.

Figure 8:
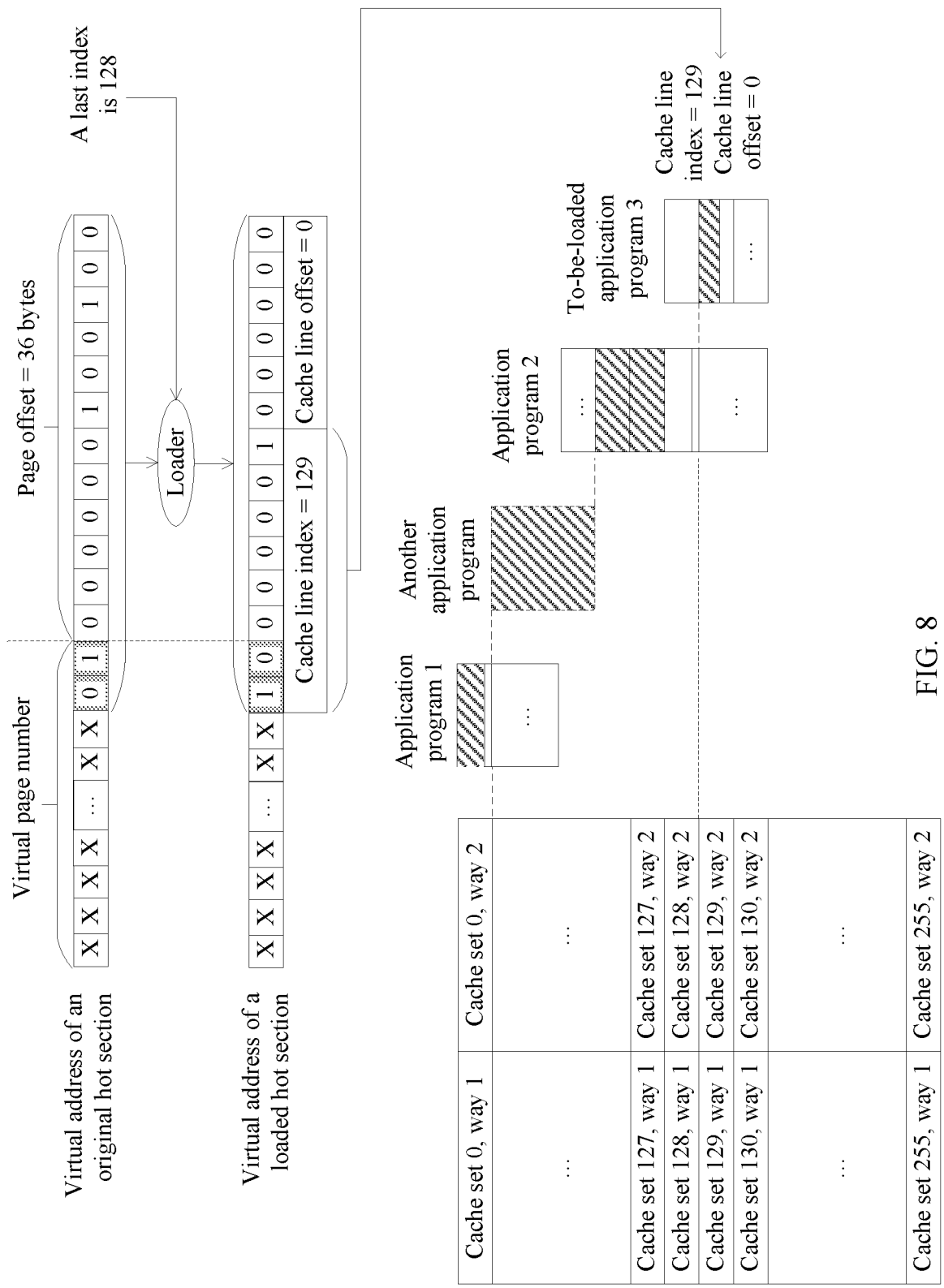
FIG. 8 is a schematic diagram of a scenario of a cache address mapping method according to an embodiment of the present invention.

As shown in FIG. 8, for example, a binary file that currently needs to be loaded is an application program 3. During compilation, hot functions in the application program 3 are merged into a hot section in an attribute modification manner (for a specific process, refer to the embodiment in FIG. 7). An fpie option is used during the compilation, and a pie option is used during linking, to ensure that the program is relocatable address-independent code. It is assumed that in this case, a base address of a virtual address page on which the hot section (which may also be referred to as an original hot section) is located is "xxxx xxxx xxxx xxxx xx01 0000 0000 0000", and a page offset is 36 bytes (that is, 0000 0010 0100). Therefore, a virtual address of the original hot section is "xxxx xxxx xxxx xxxx xx01 0000 0010 0100". If a cache set associative structure in a specific embodiment has two ways and 256 sets, and a capacity of each way is 16 kB, a capacity of each cache line is 64 bytes. Therefore, a cache line index (cache line index) corresponds to a range of bits 6 to 13 of the virtual address, and a cache line offset (cache line offset) corresponds to least significant bits 0 to 5 of the virtual address.

When loading the application program 3, an operating system may read a program file header, to obtain a related description of a segment table; and, if determining that the application program 3 has a hot section, invoke a loader in this embodiment of the present invention. On one hand, the loader obtains a base address of the hot section from the segment table, and takes bits 0 to 13 (that is, 01 0000 0010 0100) of the base address of the hot section. On the other hand, the loader records a last cache set index covered by a hot section (that is, a dash part of an application program 2 shown in FIG. 8) that is obtained after a previous loaded program (namely, the application program 2) is loaded, where the set index is 128, that is, a last_index is 128.

In a specific embodiment of the present invention, an offset operation may be performed on all virtual addresses of the entire application program 3 by using the loader. In this process, bits 0 to 13 of the virtual address of the original hot section of the application program 3 are also correspondingly offset. An offset by which the loader performs the offset operation is: 10 0000 0100 0000−01 0000 0010 0100=10 0000 0011 1100, that is, bits 0 to 13 of a target virtual address of a hot section minus bits 0 to 13 of the virtual address of the original hot section. The loader performs a relocation operation on the entire application program 3 based on this offset, and adds an offset to all relocatable symbols in the application program 3.

After the offset operation, in the cache, a mapped-to location of a loaded hot section of the application program 3 immediately follows a tail cache set of the hot section of the application program 2. In other words, a virtual address of the hot section of the application program 3 is aligned with a cache set whose set index is 129 (that is, a next cache set of the last_index). It can be learned that, after the offset operation, a virtual address of a to-be-loaded hot section is "xxxx xxxx xxxx xxxx xx10 0000 0100 0000", where bits 0 to 13 of a virtual address of a to-be-loaded hot section after relocation loading are "10 0000 0100 0000", and a cache line offset is 0 (that is, 000000).

It should be noted that, in this embodiment of the present invention, a specific implementation form of a relocation method in the operating system is not limited. After the relocation, in this case, a loaded hot section of the application program 3 is a dash part that is of the application program 3 and that needs to be loaded, as shown in FIG. 8. The hot section immediately follows the hot section of the application program 2, and is consecutively mapped to subsequent cache sets starting from the cache set 129 (where, in the embodiment of FIG. 8, the hot section is mapped only to the cache set 129).

It should be further noted that, in a specific embodiment, because the hot section is mapped starting from the cache set whose set index is ((last_index+1) % Quantity of cache sets), after an entire way is occupied by the hot section, the hot section is cyclically mapped to the cache sets. Cache set overlapping occurs between a plurality of hot sections only when an entire way of the cache is occupied, and a cache conflict occurs only when a plurality of ways are all occupied (where, in the embodiment of FIG. 8, a cache conflict occurs only after two ways are both occupied). Therefore, a conflict miss can be reduced to a maximum extent.

It should be further noted that, after the loaded hot section of the application program 3 is mapped to the cache sets, the loader updates alignment information (that is, the last_index) maintained by the loader, and updates a set index of the last cache set occupied by the hot section of the application program 3 into the alignment information. Specifically, because the capacity of each cache line is 64 bytes, a quantity of sets occupied for mapping the hot section of the application program 3 is obtained as follows: a capacity of the hot section is divided by 64 bytes, and is then rounded up. If the capacity of the hot section is less than or equal to 64 bytes, the hot section is mapped only to the cache set 129 (and may be freely mapped to a block {cache set 129, way 1} or a block {cache set 129, way 2}), and therefore, the loader updates the last_index in the maintained alignment information to 129.

It should be further noted that, in this embodiment of the present invention, the technical solution of the present invention is applicable to a set of programs. For example, an application program 1, the application program 2, the application program 3, and another application program in FIG. 8 are preset as a program set. In this embodiment of the present invention, after all programs in the program set are loaded, respective hot sections of all the programs in the program set can be consecutively distributed in a cache in mapping. In the cache, these hot sections have very small gaps and are staggered at a fine granularity, and a maximum gap does not exceed one cache set. Therefore, limited cache space is used to a maximum extent, thereby addressing an issue about consecutive mapping of hot code of a plurality of programs or libraries into a cache of a VIPT architecture.

It can be learned that, for a system architecture including a VIPT-type cache, in this embodiment of the present invention, hot functions are merged into a hot section, code address space is relocated, and the hot section that currently needs to be loaded is mapped to the next cache set of the last cache set occupied by the previous loaded hot section, so that cache line indexes (cache line index) corresponding to hot sections of different binary files are consecutive, and a gap between the hot sections is small. In this way, cache space can be more fully used, and a set of associated programs can be optimized. In addition, more space is available to another program, so that a conflict miss of the cache can be avoided to a maximum extent.

Figure 9:
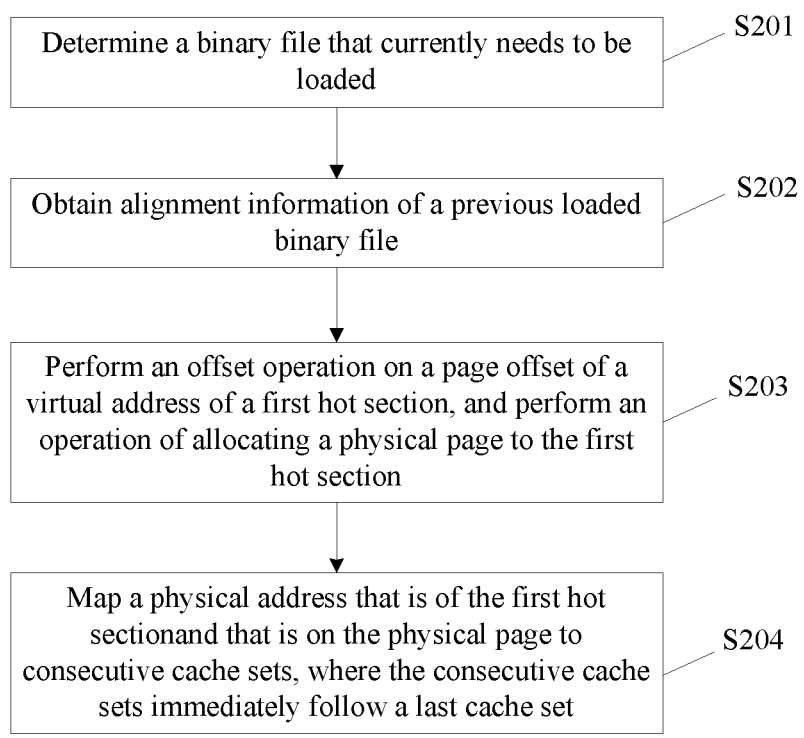
FIG. 9 is a schematic flowchart of another cache address mapping method according to an embodiment of the present invention.

The following describes another cache address mapping method provided in an embodiment of the present invention to reduce a cache conflict. The method is applied to a PIPT framework. As shown in FIG. 9, the method includes but is not limited to the following steps.

Step S201: Determine a hot section (briefly referred to as a hot section that currently needs to be loaded below) of a binary file that currently needs to be loaded.

The binary file includes a hot section, and the hot section includes one hot function, or the hot section includes a plurality of merged hot functions. The plurality of merged hot functions have consecutive addresses in the binary file, the hot functions each have a same identifier, and the identifier is used to merge the plurality of hot functions into the hot section. The binary file may be a binary file of a program or a shared library.

Specifically, for this step, refer to the description of step S101 in the embodiment in FIG. 7. Details are not described herein again.

Step S202: Obtain alignment information of a hot section (briefly referred to as a previous loaded hot section) of a previous loaded binary file, where the alignment information includes a set index of a last cache set occupied by the previous loaded hot section after the previous loaded hot section is mapped to a cache.

This embodiment of the present invention provides a loader. The loader has alignment information of a global variable nature, and the alignment information records a set index of a last cache set (to be specific, a cache line index corresponding to the cache set) occupied by a previous loaded hot section. When an operating system currently needs to load a program or a shared library, alignment information of the previous loaded hot section may be obtained by using the loader.

Step S203: Perform, based on the alignment information, an offset operation on a page offset (page offset) of a virtual address of the hot section that currently needs to be loaded, and perform a physical page allocation operation for a page on which the hot section is located, to obtain an allocated physical page and a physical address of the hot section.

The physical address includes two parts: a page frame number (page frame number, PFN) and a page offset (page offset). For PIPT, the page offset of the physical address directly originates from a page offset part of the virtual address.

For the page offset of the physical address, in a possible embodiment, the alignment information may be queried by using the loader to determine a next cache set of the last cache set occupied by the previous loaded hot section, and a PFN-related part and a page offset-related part are obtained based on the next cache set of the last cache set. The PFN-related part is a color index (color index), namely, a color index (color index) of a page related to the hot section. An offset is obtained based on the color index, the page offset-related part, and a page offset of a virtual address of the original hot section that currently needs to be loaded. An offset operation is performed, based on the offset, on a memory virtual address of the binary file that currently needs to be loaded. To be specific, an offset operation (relocation) with a specific offset is performed on both a virtual address of a hot section and a virtual address of a non-hot section. In this process, a page offset of the virtual address of the hot section is correspondingly offset, to re-obtain a new page offset of the virtual address of the hot section, and then the new page offset of the virtual address is used as the page offset of the physical address.

For the page offset of the physical address, in another possible embodiment, the alignment information may be queried by using the loader to determine a next cache set of the last cache set occupied by the previous loaded hot section, and a color index (color index) of a page related to the hot section is obtained based on the next cache set of the last cache set. An offset is obtained based on the color index and a page offset of a virtual address of the original hot section that currently needs to be loaded. An offset operation (relocation) is performed, based on the offset, on the page offset of the virtual address of the hot section that currently needs to be loaded, and no offset operation is performed on a virtual address of a non-hot section, to re-obtain a new page offset of the virtual address of the hot section, and then the new page offset of the virtual address is used as the page offset of the physical address.

For the page frame number of the physical address, because the PFN is from a page table, page allocation needs to be performed based on a bit that is in the color index and that is related to a physical page by using a physical page allocator, to obtain an allocated page, where a page frame number corresponding to the allocated page is the page frame number of the physical address.

Figure 10:
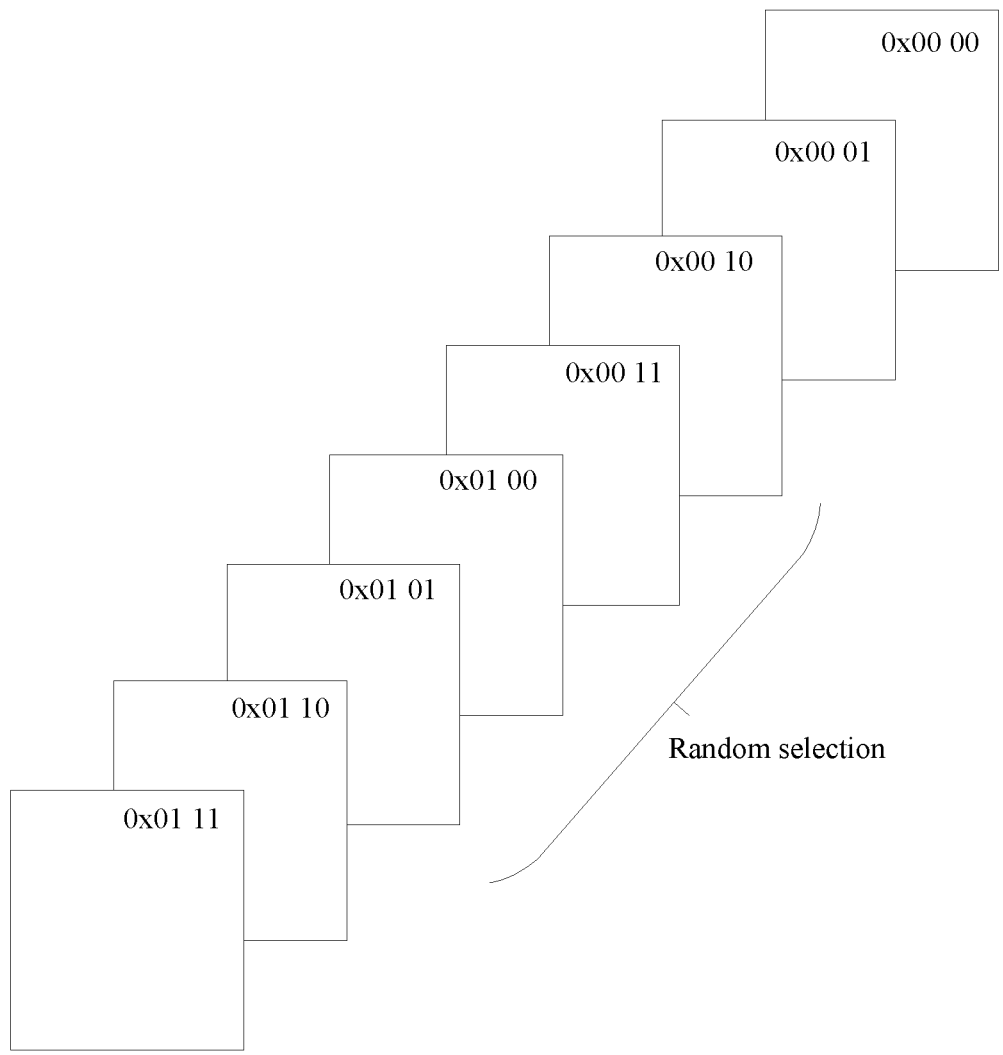
FIG. 10 is a schematic diagram of a physical page allocation scenario according to an embodiment of the present invention.

When interruption occurs due to page missing in a program execution process, physical page allocation is triggered. Specifically, in this embodiment of the present invention, the physical page allocator randomly obtains a specific quantity of consecutive physical pages based on the color index (color index). For physical addresses, if color indexes at least significant bits of their PFNs are the same, the physical addresses belong to a same cache bin, that is, the physical addresses have a same color. To implement a page alignment solution in the present invention, after a color index of a currently to-be-allocated page is determined, N consecutive physical pages may be randomly allocated, where N=Quantity of pages requested to be allocated+ Quantity of page colors−1, the quantity of pages requested to be allocated is a quantity of actually allocated physical pages, the quantity of pages requested to be allocated can meet a requirement for carrying the hot section that needs to be loaded, and the quantity of page colors is determined by a quantity of bits of the color index (for example, if the quantity of bits is Y, the quantity of page colors is 2Y). In this embodiment of the present invention, the N consecutive physical pages definitely have a physical page that conforms to the color index. A physical page with the color index is selected from the N consecutive physical pages as a physical page to be actually allocated, and the physical page can definitely meet a page alignment requirement. For example, as shown in FIG. 10, it is assumed that a color index of a physical page currently requested to be allocated is 10, and it is further assumed that the quantity of pages requested to be allocated is 1, and the quantity of page colors is 4 (where a quantity of bits of the color index is 2, and 2×2=4). Then N=1+4−1=4, the physical page allocator randomly allocates four consecutive physical pages from a series of physical pages such as physical pages numbered 0x00 00, 0x00 01, 0x00 10, and the like. As shown in the figure, the four consecutive physical pages are, for example, 0x00 10, 0x00 11, 0x01 00, and 0x01 01. It may be understood that a color index of a physical page numbered 0x00 10 is 10, and therefore, the physical page numbered 0x00 10 is finally selected as an ultimate physical page to be actually allocated.

Step S204: Map a physical address that is of the hot section and that is on the physical page to consecutive cache sets, where the consecutive cache sets immediately follow the last cache set.

After the foregoing operations, the physical address of the hot section that currently needs to be loaded can be mapped to the cache, and immediately follows a tail cache set of a previous loaded hot section, and a physical page on which the hot section that currently needs to be loaded is located is aligned with a physical page of the previous loaded hot section.

The following describes, in detail below by using an example, the another method provided in this embodiment of the present invention to reduce a cache conflict.

Figure 11:
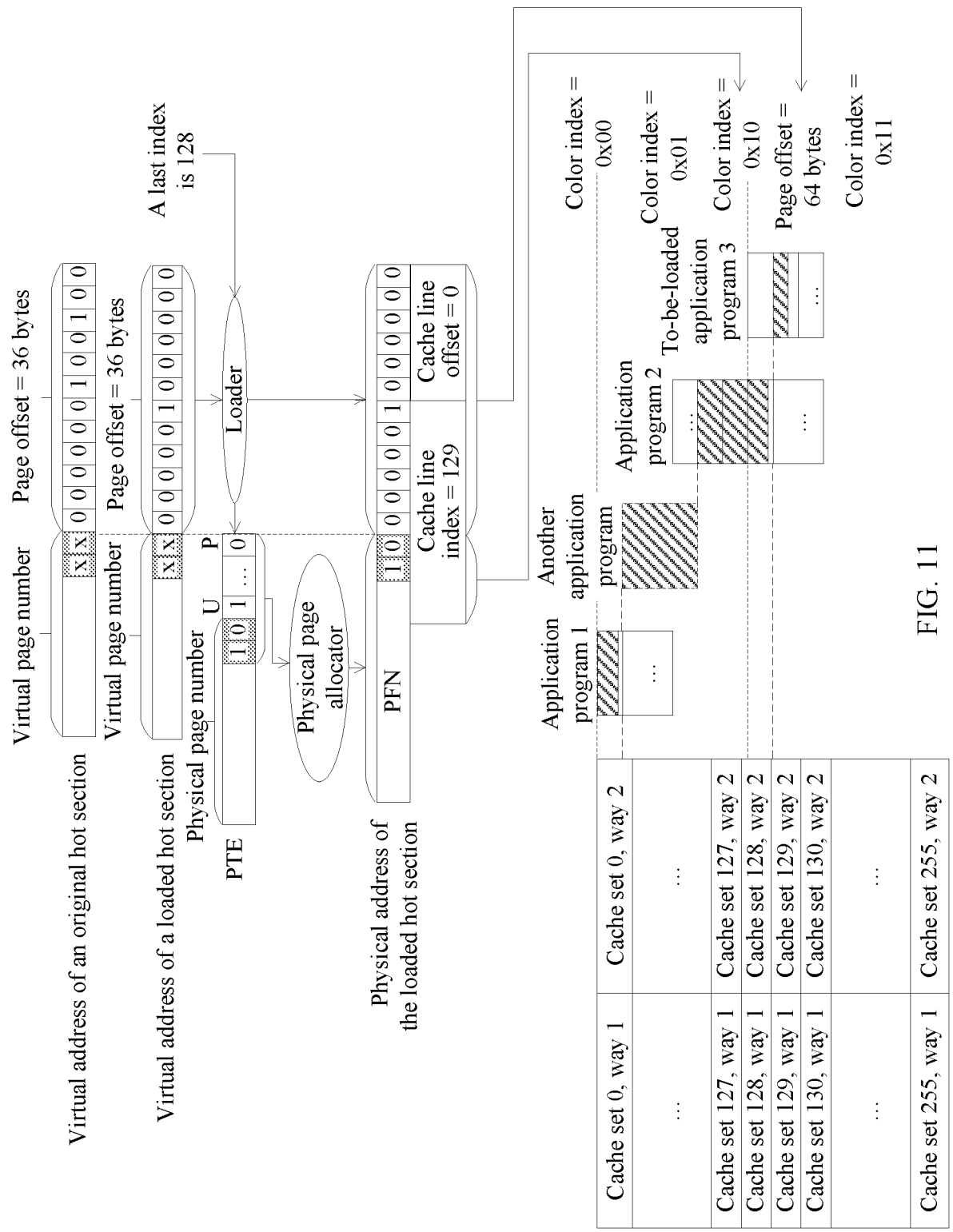
FIG. 11 is a schematic diagram of a scenario of another cache address mapping method according to an embodiment of the present invention.

As shown in FIG. 11, for example, a binary file that currently needs to be loaded is an application program 3. During compilation, hot functions in the application program 3 are merged into a hot section in an attribute modification manner (for a specific process, refer to the embodiment in FIG. 7). An fpie option is used during the compilation, and a pie option is used during linking, to ensure that the program is relocatable address-independent code. It is assumed that a base address of a virtual address page on which the hot section (which may also be referred to as an original hot section) is located is "xxxx xxxx xxxx xxxx xx01 0000 0000 0000", and a page offset is 36 bytes (that is, 0000 0010 0100). Therefore, a virtual address of the hot section is "xxxx xxxx xxxx xxxx xx01 0000 0010 0100". If a cache set associative structure in a specific embodiment has two ways and 256 sets, and a capacity of each way is 16 kB, a capacity of each cache line is 64 bytes. Therefore, a cache line index (cache line index) corresponds to a range of bits 6 to 13 of the virtual address, and a cache line offset (cache line offset) corresponds to least significant bits 0 to 5 of the virtual address.

In a specific embodiment of the present invention, when loading the application program 3, an operating system may read a program file header, to obtain a related description of a segment table; and, if determining that the program has a hot section, invoke a loader in this embodiment of the present invention to perform an offset operation on all virtual addresses of the entire application program 3. An offset for relocation is calculated by using a difference between a page offset of a loaded virtual address (which is the same as a page offset of a physical address) and a page offset of an original virtual address. On one hand, the loader obtains the virtual address of the original hot section from the segment table, and takes a page offset (that is, 0000 0010 0100) at bits 0 to 11 of the virtual address of the original hot section. On the other hand, the loader records a last cache set index covered by a hot section that is obtained after a previous loaded program (namely, an application program 2) is loaded, where the set index is 128, that is, a last_index is 128. In this case, a physical address of a hot section that is of the application program 3 and that is obtained after the original hot section is loaded is aligned with a next cache set of the last_index, that is, a cache set 129, and a cache line offset is 0. Therefore, bits 0 to 13 of the physical address of the hot section after relocation loading are (10 0000 0100 0000), and a page offset at bits 0 to 11 of the physical address of the hot section is taken. Because a page offset of a physical address in PIPT originates from a page offset of a virtual address, an offset by which the offset operation is performed on the entire application program 3 is: 0000 0100 0000–0000 0010 0100=0000 0001 1100. It may be understood that, in an offset operation process, the page offset (the bits 0 to 11) of the virtual address of the original hot section is also offset based on the offset, to obtain a new page offset of the virtual address of the hot section. In this way, a required page offset of the physical address can be obtained.

In addition, for PIPT, a page frame number PFN of a physical address is from a page table, and is determined only when processing is interrupted due to page missing in a program running process after a program is loaded; and a color index in the PFN is directly related to a cache line index, where the color index represents alignment information of the physical page in the cache, and can affect mapping of a cache set. As shown in FIG. 11, the loader performs calculation based on the last_index to obtain a part that is in the cache line index (10 0000 01) and that is related to the PFN, and determines that the color index is 10. After loading the program and relocating a virtual address, the loader saves a color index of each physical page covered by the hot section into a PFN interval of a corresponding page entry. When a U-bit flag of a hot section page entry is 1, it indicates that this entry requires physical page allocation and alignment performed by a physical page allocator; and when a P-bit flag is 0, it means that the physical page is to be allocated. Therefore, for a PIPT cache architecture, in the present invention, physical page allocation needs to be further performed by a physical page allocator. The physical page allocator is to allocate physical pages whose PFNs have last several bits equal to the color index, that is, to align physical pages. The physical page allocator in the present invention preliminarily allocates N consecutive physical pages based on a quantity of pages requested to be allocated and page alignment information, where N=Quantity of pages requested to be allocated+Quantity of page colors−1. For details, refer to the description in the embodiment in FIG. 10. Details are not described herein again. In such a page allocation method, it can be ensured that aligned physical pages (or consecutive physical pages) can definitely be found in an obtained memory. The physical page allocator selects the physical page (where a color index of the physical page is 10) and maps the physical page to a page entry in which the hot section is located. In this case, the physical address of the hot section that needs to be loaded meets an object that a cache line index is 129 (that is, 10000001) and a cache line offset is 0 (000000). As shown in FIG. 11, a color index of a physical page on which a last cache set occupied by a hot section of the application program 2 is located is 0x10, and a color index of a physical page on which a first cache set occupied by a hot section of the application program 3 is located is also 0x10, so that the physical pages are aligned with each other.

It should be further noted that, in a specific embodiment, because the hot section is mapped starting from a cache set whose set index is ((last_index+1) % Quantity of cache sets), after an entire way is occupied by the hot section, the hot section is cyclically mapped to the cache sets. Cache set overlapping occurs between a plurality of hot sections only when an entire way of the cache is occupied, and a cache conflict occurs only when a plurality of ways are all occupied (where, in the embodiment of FIG. 11, a cache conflict occurs only after two ways are both occupied). Therefore, a conflict miss can be reduced to a maximum extent.

It should be further noted that, after the loaded hot section of the application program 3 is mapped to the cache sets, the loader updates alignment information (that is, the last_index) maintained by the loader, and updates a set index of the last cache set occupied by the hot section of the application program 3 into the alignment information. In other words, the loader updates the last_index in the maintained alignment information to 129.

It should be further noted that, in this embodiment of the present invention, the technical solution of the present invention is applicable to a set of programs. For example, an application program 1, the application program 2, the application program 3, and another application program in FIG. 11 are preset as a program set. In this embodiment of the present invention, after all programs in the program set are loaded, respective hot sections of all the programs in the program set can be consecutively distributed in a cache in mapping. In the cache, these hot sections have very small gaps and are staggered at a fine granularity, and a maximum gap does not exceed one cache set. Therefore, limited cache space is used to a maximum extent, thereby addressing an issue about consecutive mapping of hot code of a plurality of programs or libraries into a cache of a PIPT architecture.

It can be learned that, for a system architecture including a PIPT-type cache, in this embodiment of the present invention, hot functions are merged into a hot section, the loader performs the offset operation on the page offset of the virtual address, the page allocated by the physical page allocator is obtained in a relatively convenient manner, code address space is relocated, and the hot section that currently needs to be loaded is mapped to the next cache set of the last cache set occupied by the previous loaded hot section, so that cache line indexes (cache line index) corresponding to hot sections of different binary files are consecutive, and a gap between the hot sections is small. In this way, cache space can be more fully used, and a set of associated programs can be optimized. In addition, more space is available to another program, so that a conflict miss of the cache can be avoided to a maximum extent.

The foregoing describes the methods in the embodiments of the present invention, and the following describes a related device in an embodiment of the present invention.

An embodiment of the present invention provides a device, including an obtaining module, a loader module, and an offsetting module.

The obtaining module is configured to determine a binary file that currently needs to be loaded, where the binary file includes a first hot section, and the first hot section includes one hot function, or the first hot section includes a plurality of merged hot functions.

The loader module is configured to obtain alignment information of a second hot section, where the second hot section is a hot section that has been loaded before the first hot section is loaded, the alignment information includes a set index of a last cache set occupied by the second hot section after the second hot section is mapped into a cache, the cache belongs to an N-way set associative structure, and N is an integer greater than or equal to 1.

The offsetting module is configured to perform an offset operation on the first hot section based on the alignment information, so that the first hot section is mapped to consecutive cache sets, and the consecutive cache sets immediately follow the last cache set.

The device provided in this embodiment of the present invention is described in detail below from two specific implementations: a VIPT-type cache and a PIPT-type cache.

Figure 12:
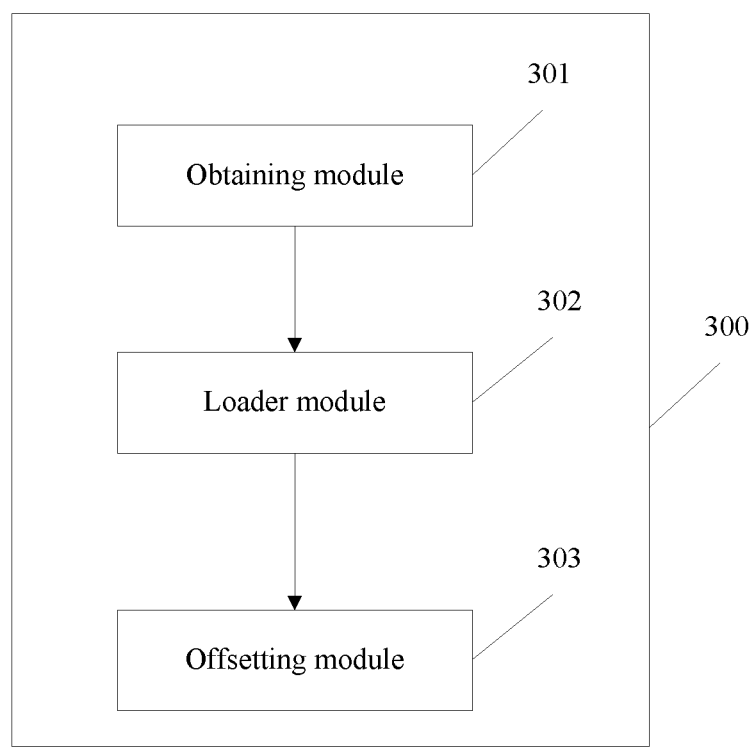
FIG. 12 is a schematic structural diagram of a device according to an embodiment of the present invention.

As shown in FIG. 12, based on a same invention idea, an embodiment of the present invention provides a device 300. The device 300 specifically includes an obtaining module 301, a loader module 302, and an offsetting module 303, as described below.

The obtaining module 301 is configured to determine a binary file that currently needs to be loaded, where the binary file includes a first hot section, and the first hot section includes one hot function, or the first hot section includes a plurality of merged hot functions.

The loader module 302 is configured to obtain alignment information of a second hot section, where the second hot section is a hot section that has been loaded before the first hot section is loaded, the alignment information includes a set index of a last cache set occupied by the second hot section after the second hot section is mapped into a cache, the cache belongs to an N-way set associative structure, N is an integer greater than or equal to 1, and a type of the cache is a virtual index physical tag VIPT architecture.

The offsetting module 303 is configured to perform an offset operation on a virtual address of the first hot section based on the alignment information, so that the virtual address of the first hot section is mapped to consecutive cache sets, and the consecutive cache sets immediately follow the last cache set.

In a specific embodiment, that the offsetting module 303 is configured to perform an offset operation on a virtual address of the first hot section based on the alignment information includes: the loader module 302 is configured to obtain the virtual address of the first hot section; and the offsetting module 303 is configured to: determine a next cache set of the last cache set based on the alignment information; obtain an offset of the offset operation based on the next cache set and the virtual address of the first hot section; and perform the offset operation on the virtual address of the first hot section based on the offset of the offset operation.

In a specific embodiment, that the first hot section includes a plurality of merged hot functions includes: The plurality of merged hot functions have consecutive addresses in the first hot section, the hot functions each have a same identifier, and the identifier is used to merge the plurality of hot functions into the first hot section.

In a specific embodiment, before the obtaining module 301 determines the binary file that currently needs to be loaded, the obtaining module 301 is configured to determine, based on a virtual address size virtual address size of the second hot section, a quantity of cache sets occupied by the second hot section; and the loader module 302 is configured to: determine, based on the quantity of cache sets occupied by the second hot section and a last cache set occupied by a third hot section after the third hot section is mapped into the cache, the last cache set occupied by the second hot section after the second hot section is mapped into the cache; and update a set index of the last cache set into the alignment information, where the third hot section is a hot section that has been loaded into the cache before the second hot section is loaded.

It should be noted that, for a specific implementation of each function module in the device 300, reference may be made to corresponding descriptions of the method embodiment shown in FIG. 6. Details are not described herein again.

Figure 13:
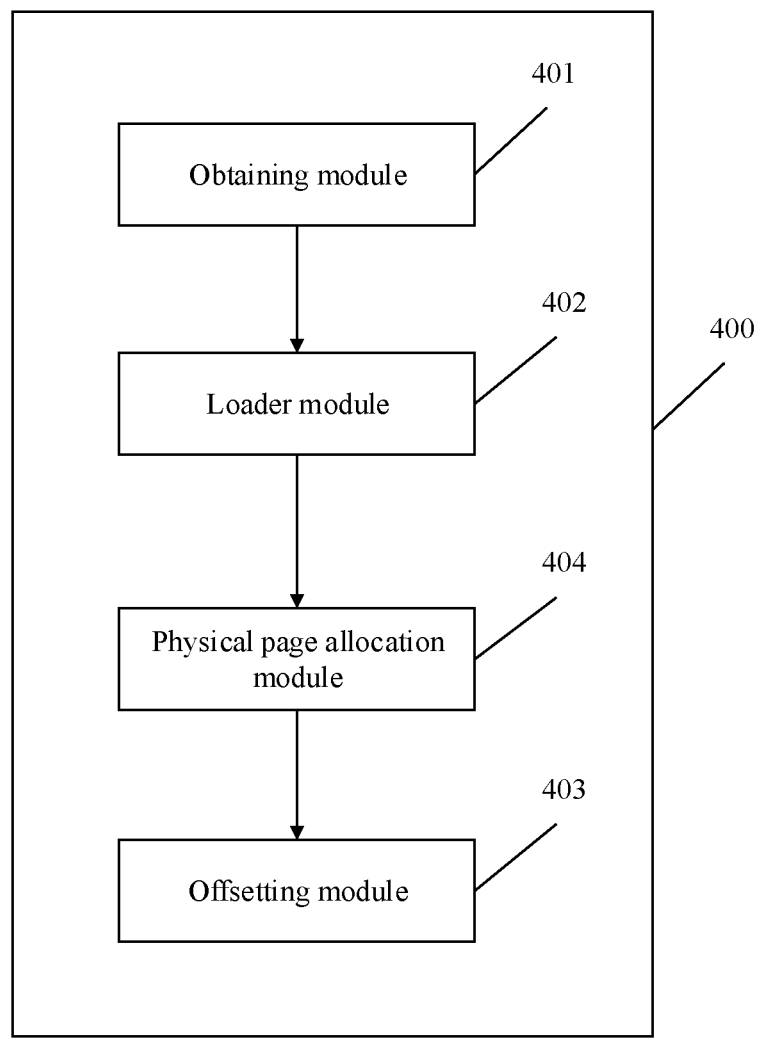
FIG. 13 is a schematic structural diagram of another device according to an embodiment of the present invention.

As shown in FIG. 13, based on a same invention idea, an embodiment of the present invention provides a device 400. The device 400 specifically includes an obtaining module 401, a loader module 402, an offsetting module 403, and a physical page allocation module 404, as described below.

The obtaining module 401 is configured to determine a binary file that currently needs to be loaded, where the binary file includes a first hot section, and the first hot section includes one hot function, or the first hot section includes a plurality of merged hot functions.

The loader module 402 is configured to obtain alignment information of a second hot section, where the second hot section is a hot section that has been loaded before the first hot section is loaded, the alignment information includes a set index of a last cache set occupied by the second hot section after the second hot section is mapped into a cache, the cache belongs to an N-way set associative structure, N is an integer greater than or equal to 1, and a type of the cache is a physical index physical tag PIPT architecture.

The offsetting module 403 is configured to perform an offset operation on a first page offset of a virtual address of the first hot section based on the alignment information.

The physical page allocation module 404 is configured to: perform a physical page allocation operation for a physical page on which the first hot section is located, to obtain an allocated physical page and a physical address of the first hot section; and map the physical address that is of the first hot section and that is on the physical page to consecutive cache sets, where the consecutive cache sets immediately follow the last cache set.

In a specific embodiment, that the offsetting module 403 is configured to perform an offset operation on a first page offset of a virtual address of the first hot section based on the alignment information and the physical page allocation module 404 is configured to perform a physical page allocation operation for a physical page on which the first hot section is located, to obtain an allocated physical page and a physical address of the first hot section includes:

the offsetting module 403 is configured to: obtain an offset of the offset operation based on the next cache set and the first page offset of the virtual address of the first hot section; perform the offset operation on the first page offset of the virtual address of the first hot section based on the offset, to obtain a second page offset of the virtual address of the first hot section; and obtain, based on the next cache set of the last cache set, a color index of a page related to the first hot section; and the physical page allocation module 404 is configured to: obtain an allocated physical page based on the color index; and obtain the physical address of the first hot section based on the second page offset and a page frame number PFN that corresponds to the allocated physical page.

In a specific embodiment, that the physical page allocation module 404 is configured to obtain an allocated physical page based on the color index includes: the physical page allocation module 404 randomly obtains a specific quantity of consecutive physical pages based on the color index, and selects a physical page that conforms to the color index as the allocated physical page from the specific quantity of consecutive physical pages.

In a specific embodiment, the specific quantity is equal to a sum of a quantity of the allocated physical pages and a quantity of page colors minus 1, and the quantity of page colors is determined by a quantity of bits of the color index.

In a specific embodiment, before the obtaining module determines the binary file that currently needs to be loaded, the obtaining module 401 is configured to determine, based on a virtual address size virtual address size of the second hot section, a quantity of cache sets occupied by the second hot section; and the loader module 402 determines, based on the quantity of cache sets occupied by the second hot section and a last cache set occupied by a third hot section after the third hot section is mapped into the cache, the last cache set occupied by the second hot section after the second hot section is mapped into the cache; and updates a set index of the last cache set into the alignment information, where the third hot section is a hot section that has been loaded into the cache before the second hot section is loaded.

It should be noted that, for a specific implementation of each function module in the device 400, reference may be made to corresponding descriptions of the method embodiment shown in FIG. 9. Details are not described herein again.

Figure 14:
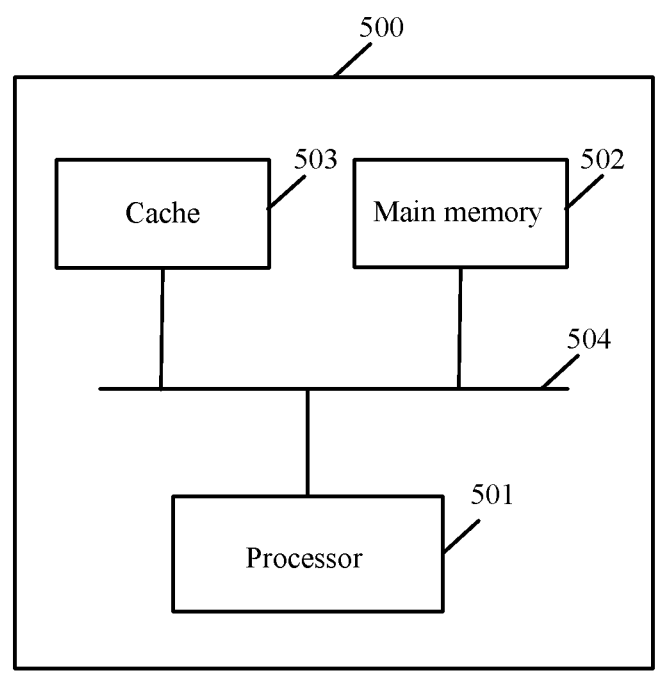
FIG. 14 is a schematic structural diagram of still another device according to an embodiment of the present invention.

Based on a same inventive idea, an embodiment of the present invention provides still another device 500. FIG. 14 is a schematic diagram of a hardware structure of a device 500 used to reduce a cache conflict. The device 500 may include a processor 501, a memory (including a main memory 502 and a cache 503), and a bus 504. The processor 501 and the memory are connected to each other by using the bus 504.

The processor 501 may be a general purpose central processing unit (CPU), a microprocessor, an application-specific integrated circuit (ASIC), or one or more integrated circuits, and is configured to execute a related program, so as to implement the technical solution provided in this embodiment of the present invention.

The memory may be a read-only memory (ROM), a static storage device, a dynamic storage device, or a random access memory (RAM). The memory may store an operating system, an application program, a binary file, and the like. When the technical solution provided in this embodiment of the present invention is implemented by software or firmware, program code used to implement the technical solution provided in this embodiment of the present invention is stored in the memory, and is executed by the processor 501.

The bus 504 may include a path for transmitting information between various components (for example, the main memory 502, the cache 503, and the processor 501) of the device.

It should be noted that, although only the processor 501, the main memory 502, the cache 503, and the bus 504 are shown as hardware shown in FIG. 14, in a specific implementation process, a person skilled in the art should understand that the device terminal may further include another component required for implementing normal running. In specific implementation, the memory may further include a non-volatile memory and the like. In addition, depending on a specific requirement, a person skilled in the art should understand that a hardware component for implementing another function may be further included.

The processor 501 may be configured to invoke the program code stored in the memory, to perform the following steps:

determining a binary file that is in the main memory and that currently needs to be loaded, where the binary file includes a first hot section, and the first hot section includes one hot function, or the first hot section includes a plurality of merged hot functions;

obtaining alignment information of a second hot section, where the second hot section is a hot section that has been loaded before the first hot section is loaded, the alignment information includes a set index of a last cache set occupied by the second hot section after the second hot section is mapped into the cache, the cache 503 belongs to an N-way set associative structure, and N is an integer greater than or equal to 1; and performing an offset operation on the first hot section based on the alignment information, so that the first hot section is mapped to consecutive cache sets of the cache 503, and the consecutive cache sets immediately follow the last cache set.

Specifically, when a type of the cache 503 is a VIPT architecture, the processor 501 may be configured to perform the following steps based on the program code:

determining a binary file that currently needs to be loaded, where the binary file includes a first hot section, and the first hot section includes one hot function, or the first hot section includes a plurality of merged hot functions;

obtaining alignment information of a second hot section, where the second hot section is a hot section that has been loaded before the first hot section is loaded, the alignment information includes a set index of a last cache set occupied by the second hot section after the second hot section is mapped into the cache, the cache belongs to an N-way set associative structure, N is an integer greater than or equal to 1, and a type of the cache is a virtual index physical tag VIPT architecture; and performing an offset operation on a virtual address of the first hot section based on the alignment information, so that the virtual address of the first hot section is mapped to consecutive cache sets, and the consecutive cache sets immediately follow the last cache set.

It should be noted that, for steps performed by the processor 501 and other technical features related to the processor 501, reference may be further made to corresponding descriptions in the method embodiment shown in FIG. 6. Details are not described herein again.

Specifically, when a type of the cache 503 is a PIPT architecture, the processor 501 may be configured to perform the following steps based on the program code:

determining a binary file that currently needs to be loaded, where the binary file includes a first hot section, and the first hot section includes one hot function, or the first hot section includes a plurality of merged hot functions;

obtaining alignment information of a second hot section, where the second hot section is a hot section that has been loaded before the first hot section is loaded, the alignment information includes a set index of a last cache set occupied by the second hot section after the second hot section is mapped into the cache, the cache belongs to an N-way set associative structure, N is an integer greater than or equal to 1, and a type of the cache is a physical index physical tag PIPT architecture;

performing an offset operation on a first page offset of a virtual address of the first hot section based on the alignment information;

performing a physical page allocation operation for a physical page on which the first hot section is located, to obtain an allocated physical page and a physical address of the first hot section; and mapping the physical address that is of the first hot section and that is on the physical page to consecutive cache sets, where the consecutive cache sets immediately follow the last cache set.

It should be noted that, for steps performed by the processor 501 and other technical features related to the processor 501, reference may be further made to corresponding descriptions in the method embodiment shown in FIG. 9. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or a part of the procedures or functions are generated according to the embodiments of the present invention. The computer may be a general purpose computer, a special purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the description of each embodiment has respective focuses. For a part that is not described in detail in an embodiment, refer to related descriptions in other embodiments.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A cache address mapping method, wherein a cache comprises a plurality of cache sets, and the method comprises:

obtaining a binary file, the binary file comprising a first hot section, and the first hot section comprising one hot function or comprising a plurality of merged hot functions;

obtaining alignment information of a second hot section, the second hot section comprising a hot section loaded into the cache, and the alignment information comprises a set index of a last cache set occupied by the second hot section after the second hot section is loaded into the cache; and performing an offset operation on a storage address of the first hot section based on the alignment information, and mapping the storage address of the first hot section to a cache set with a consecutive set index in the cache, the cache set with the consecutive set index being adjacent to the last cache set, and the storage address of the first hot section comprising a virtual address or a physical address.

2. The method according to claim 1, wherein a mapping manner of the cache comprises mapping the virtual address to the cache set of the cache; and the performing the offset operation comprises:

performing the offset operation on the virtual address of the first hot section based on the alignment information, and mapping the virtual address of the first hot section to the cache set with the consecutive set index, wherein the cache set with the consecutive set index is adjacent to the last cache set.

3. The method according to claim 2, wherein the performing the offset operation comprises:

obtaining the virtual address of the first hot section;

determining an adjacent cache set adjacent to the last cache set based on the alignment information;

obtaining an offset of the offset operation based on the adjacent cache set and the virtual address of the first hot section; and performing the offset operation on the virtual address of the first hot section based on the offset.

4. The method according to claim 1, wherein the first hot section comprises the plurality of merged hot functions, the plurality of merged hot functions have consecutive addresses in the first hot section, the plurality of merged hot functions each have a same identifier, and the identifier is used to merge the plurality of hot functions into the first hot section.

5. The method according to claim 1, wherein a mapping manner of the cache comprises mapping the physical address to the cache set of the cache; and the performing the offset operation comprises:

performing the offset operation on a first page offset of the virtual address of the first hot section based on the alignment information, and performing a physical page allocation operation for a physical page on which the first hot section is located, to obtain an allocated physical page and the physical address of the first hot section; and mapping the physical address of the first hot section on the physical page to the cache set with the consecutive set index, wherein the cache set with the consecutive set index is adjacent to the last cache set.

6. The method according to claim 5, wherein the performing the offset operation on the first page offset of the virtual address of the first hot section based on the alignment information, and performing the physical page allocation operation for the physical page on which the first hot section is located, to obtain the allocated physical page and the physical address of the first hot section comprises:

obtaining an offset of the offset operation based on an adjacent cache set adjacent to the last cache set and the first page offset of the virtual address of the first hot section;

performing the offset operation on the first page offset of the virtual address of the first hot section based on the offset to obtain a second page offset of the virtual address of the first hot section;

obtaining, based on the adjacent cache set adjacent to the last cache set, a color index of a page related to the first hot section;

obtaining the allocated physical page based on the color index; and obtaining the physical address of the first hot section based on the second page offset and a page frame number (PFN) corresponding to the allocated physical page.

7. The method according to claim 6, wherein the obtaining the allocated physical page based on the color index comprises:

randomly obtaining a specific quantity of consecutive physical pages from a physical page allocator based on the color index; and selecting a physical page that conforms to the color index as the allocated physical page from the specific quantity of consecutive physical pages.

8. The method according to claim 7, wherein the specific quantity is equal to a sum of a quantity of the allocated physical pages and a quantity of page colors minus 1, and the quantity of page colors is determined by a quantity of bits of the color index.

9. The method according to claim 1, wherein the method further comprises:

determining, based on a virtual address size of the second hot section, a quantity of cache sets occupied by the second hot section; and determining, based on the quantity of cache sets occupied by the second hot section and the last cache set occupied by a third hot section after the third hot section is loaded into the cache, the last cache set occupied by the second hot section after the second hot section is loaded into the cache; and updating the set index of the last cache set into the alignment information, wherein the third hot section has been loaded into the cache before the second hot section is loaded into the cache.

10. A device, comprising:

a cache comprising a plurality of cache sets; and a processor in communication with the cache, the processor configured to:

obtain a binary file, the binary file comprising a first hot section, and the first hot section comprising one hot function or comprising a plurality of merged hot functions;

obtain alignment information of a second hot section, the second hot section comprising a hot section loaded into the cache, and the alignment information comprises a set index of a last cache set occupied by the second hot section; and perform an offset operation on a storage address of the first hot section based on the alignment information, and map the storage address of the first hot section to a cache set with a consecutive set index in the cache, the cache set with the consecutive set index being adjacent to the last cache set, and the storage address comprising a virtual address or a physical address.

11. The device according to claim 10, wherein a mapping manner of the cache comprises mapping the virtual address to the cache set of the cache; and the processor is further configured to perform the offset operation comprises:

perform the offset operation on the virtual address of the first hot section based on the alignment information, and mapping the virtual address of the first hot section to the cache set with the consecutive set index, wherein the cache set with the consecutive set index are adjacent to the last cache set.

12. The device according to claim 10, wherein a mapping manner of the cache comprises mapping the physical address to the cache set of the cache; and the processor is configured to perform the offset operation on a first page offset of the virtual address of the first hot section based on the alignment information, and perform a physical page allocation operation for a physical page on which the first hot section is located, to obtain an allocated physical page and the physical address of the first hot section; and map the physical address of the first hot section on the physical page to the cache set with the consecutive set index, wherein the cache set with the consecutive set index is adjacent to the last cache set.

13. A non-transitory storage medium storing computer instructions, that when executed by a processor, cause the processor to perform the steps of:

obtaining a binary file, the binary file comprising a first hot section, and the first hot section comprising one hot function or comprising a plurality of merged hot functions;

obtaining alignment information of a second hot section, the second hot section comprising a hot section that has been loaded into the cache, and the alignment information comprises a set index of a last cache set occupied by the second hot section; and performing an offset operation on the storage address of the first hot section based on the alignment information, and mapping the first hot section to a cache set with a consecutive set index in the cache, the cache set with the consecutive set index being adjacent to the last cache set, and the storage address comprising a virtual address or a physical address.

14. The non-transitory storage medium according to claim 13, wherein a mapping manner of the cache comprises mapping the virtual address to the cache set of the cache; and the performing the offset operation comprises:

performing the offset operation on the virtual address of the first hot section based on the alignment information, and mapping the virtual address of the first hot section to the cache set with the consecutive set index, wherein the cache set with the consecutive set index is adjacent to the last cache set.

15. The non-transitory storage medium according to claim 14, wherein the performing the offset operation comprises:

obtaining the virtual address of the first hot section;

determining an adjacent cache set adjacent to the last cache set based on the alignment information;

obtaining an offset of the offset operation based on the adjacent cache set and the virtual address of the first hot section; and performing the offset operation on the virtual address of the first hot section based on the offset.

16. The non-transitory storage medium according to claim 13, wherein the first hot section comprises the plurality of merged hot functions, the plurality of merged hot functions have consecutive addresses in the first hot section, the plurality of merged hot functions each have a same identifier, and the identifier is used to merge the plurality of hot functions into the first hot section.

17. The non-transitory storage medium according to claim 13, wherein a mapping manner of the cache comprises mapping the physical address to the cache set of the cache; and the performing the offset operation on the first hot section based on the alignment information comprises:

performing the offset operation on a first page offset of the virtual address of the first hot section based on the alignment information, and performing a physical page allocation operation for a physical page on which the first hot section is located, to obtain an allocated physical page and the physical address of the first hot section; and mapping the physical address of the first hot section on the physical page to the cache set with the consecutive set index, wherein the cache set with the consecutive set index is adjacent to the last cache set.

* * * * *

UNITED STATES PATENT AND TRADEMARK OFFICE
CERTIFICATE OF CORRECTION

| | |
|---|---|
| PATENT NO. | : 11,256,630 B2 |
| APPLICATION NO. | : 16/886752 |
| DATED | : February 22, 2022 |
| INVENTOR(S) | : Lv et al. |

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Page 2, Item (56) Other Publications, Citation 4: "Gonz lez" should read -- Gonzalez --.

Signed and Sealed this
Fourteenth Day of June, 2022

Katherine Kelly Vidal
*Director of the United States Patent and Trademark Office*